United States Patent
Hagiwara

(10) Patent No.: US 8,551,372 B2
(45) Date of Patent: Oct. 8, 2013

(54) PROCESS FOR PRODUCING AN OPTICAL FILM

(75) Inventor: Tatsuki Hagiwara, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 667 days.

(21) Appl. No.: 12/733,957

(22) PCT Filed: Sep. 26, 2008

(86) PCT No.: PCT/JP2008/067440
§ 371 (c)(1),
(2), (4) Date: Mar. 31, 2010

(87) PCT Pub. No.: WO2009/044673
PCT Pub. Date: Apr. 9, 2009

(65) Prior Publication Data
US 2010/0239837 A1 Sep. 23, 2010

(30) Foreign Application Priority Data
Oct. 5, 2007 (JP) ................................. 2007-262040

(51) Int. Cl.
*B29D 11/00* (2006.01)
(52) U.S. Cl.
USPC .............................. 264/1.6; 264/2.7; 264/217
(58) Field of Classification Search
USPC ............... 264/1.1, 1.34, 2.7, 216, 217, 288.4, 264/1.6
See application file for complete search history.

(56) References Cited

U.S. PATENT DOCUMENTS

| 7,964,127 B2 | 6/2011 | Kazama |
| 2006/0214319 A1 | 9/2006 | Kazama |
| 2007/0196592 A1 | 8/2007 | Ono |
| 2009/0161214 A1 | 6/2009 | Nakai |

FOREIGN PATENT DOCUMENTS

| CN | 1840321 A | 10/2006 |
| CN | 1965021 A | 5/2007 |
| CN | 200954682 Y | 10/2007 |
| JP | 09-039066 A | 2/1997 |

(Continued)

OTHER PUBLICATIONS

Machine English translation of JP 2008-039807, Oct. 2012.*
Chinese Office Action dated Jul. 30, 2012 (and English translation thereof) in counterpart Chinese Application No. 200880109531.7.

*Primary Examiner* — Mathieu D. Vargot
(74) *Attorney, Agent, or Firm* — Holtz, Holtz, Goodman & Chick, PC

(57) ABSTRACT

This invention provides a process for producing an optical film, which, even when a film is produced by casting using a melt casting film forming method so that the central part in the widthwise direction is thick, can finally realize a flat film having an even thickness and good flatness and possessing excellent optical properties. The production process of an optical film can meet recent demands for reduced film thickness, increased film width, and improved film quality in protective films for liquid crystal polarizing plates. The production process of an optical film by a melt casting film forming method is characterized in that, in an MD stretching step, an unstretched film after nipping is stretched in a transfer direction (MD direction) of the same film by a factor of not less than 1.1 and not more than 3.0, and, in an extruding step, the following relationship is satisfied: 10 µm≤T1−T2≤200 µm wherein T1 represents the film thickness at the central part in the widthwise direction of an extruded web, µm; and T2 represents the film thickness at both ends in the widthwise direction of the extruded web, µm.

6 Claims, 3 Drawing Sheets

(56) References Cited

FOREIGN PATENT DOCUMENTS

| | | |
|---|---|---|
| JP | 09-304616 A | 11/1997 |
| JP | 2000-028828 A | 1/2000 |
| JP | 2006-334842 A | 12/2006 |
| JP | 2007-137028 A | 6/2007 |
| JP | 2008-039807 A | 2/2008 |
| WO | WO 2007/061085 A1 | 5/2007 |

* cited by examiner

CAST FILM
(BEFORE MD
STRETCHING)

EFFECTIVE WIDTH
( = PORTION CORRESPONDING
TO PRODUCT)

PRODUCT
(AFTER MD
STRETCHING)

PRODUCT RANGE

PROCESS FOR PRODUCING AN OPTICAL FILM

This application is the United States national phase application of International Application PCT/JP2008/067440 filed Sep. 26, 2008.

TECHNICAL FIELD

The present invention relates to an optical film with a high flatness that is produced by a melt casting film forming method, and, in particular, relates to an optical film capable of being utilized for a polarizing plate protection film, a retardation film and a view angle expanding film for use in a liquid crystal display device, further for various kinds of functional film such as an antireflection film for use in a plasma display film, as well as for various kinds of functional film for use in an organic EL display and the like. Further, the present invention relates to a method of manufacturing these films.

BACKGROUND ART

In recent years, development to make a liquid crystal display device thinner, lighter, larger in screen size and higher in fineness has been advancing. With this development, a request to make a protection film for liquid crystal polarizing plates thinner, wider in width, and higher in quality becomes strong. Generally, a cellulose ester film is widely used for the protection film for polarizing plates. With the trend to make a screen larger, an original film of the cellulose ester film is required to be wider in film width and longer in roll form.

Conventionally, in manufacture of an optical film by a melt casting film producing method with a so-called touch roller method, an elastic roller has been used. However, there is a problem that when the width of a original is widened, even if an elastic touch roller is used, the touch roller does not come in contact a film surface uniformly due to a deflection of the roller.

If the film thickness of an original film is made in a form of a convex shaped from both end portions to a center portion in a widthwise direction of a film (hereafter, referred to as a center portion thicker film), the problem caused by a deflection of the roller may be solved. However, there is another problem that the film with the convex becomes out of a specification as a product. Further, when a touch roller presses strongly a film at the time of casting in a film production by a touch roller method, residual strain takes place in the film. Thereafter, when the film is stretched in a stretching process, stretching unevenness takes place due to the residual strain, and layer thickness unevenness take place in the resultant film.

As a patent document in connection with a production method of an optical film which conventionally uses an elastic touch roller in order to improve such residual strain, there is the following document:

Patent Document 1: Japanese Unexamined Patent Publication No. 2006-334842 official report

DISCLOSURE OF THE INVENTION

Problem to be Solved by the Invention

Patent Document 1 discloses a production method of thermoplastic film, which can prevent the occurrence of stretching unevenness at the time of stretching through the suppression of residual strain by a so-called polishing roller method so that a film with a high optical characteristic can be obtained.

Further, Patent document 1 discloses that melted resin is extruded in a form of a seat from a die, the sheet-formed resin is led between a pair of polishing rollers, and cooled while being pinched between the pair of polishing rollers, whereby a cellulose acylate film is formed, and as the polishing rollers, a roller whose surface is covered with a fluorine system resin is employed.

However, in the conventional polishing roller method, if the width of a film is widened, residual strain tends to take place in the film. Therefore, if a wide width film produced by such a polishing roller method is stretched, large stretching unevenness (stretching distribution) takes place and also retardation distribution takes place in the film. As a result, there is a problem that an optical film having a high optical characteristic cannot be obtained. Therefore, for a request to make a protection film for liquid crystal polarizing plates thinner in thickness, wider in width and higher in quality in recent years, only the use of a wider width elastic roller cannot solve the conventional problems.

An object of the present invention is to solve the problems of the above-mentioned conventional technique, and to provide a producing method of an optical film, an optical film produced by the method, a polarizing plate employed the optical film and a display device, in which a final film thickness configuration can be made flat even for a film casted in a form of a center portion thicker film by a combination of a film thickness control for a web in casting and a MD stretching of a web (film) by a so-called heater heating method in addition to the use of a touch roller composed of an elastic roller, an optical film having a good flatness and excellent optical characteristics can be produced, and the method can be responsible sufficiently to a request to make a protection film thinner in thickness, wider in width and higher in quality for polarizing plates in recent years.

Means for Solving a Problem

As a result of repeating investigation earnestly in view of the above-mentioned points, the inventor found the following matters, thereby achieving the present invention. Namely, in addition to the use of a touch roller composed of elastic rollers, when controlling of a film thickness of web in casting and MD stretching by a so-called heater heating method in a actual stretching span of 300 mm or less are combined, a final film thickness configuration can be made flat even for a film cast in a center portion thicker film, whereby an optical having a good flatness and excellent optical characteristics can be produced.

According to a first aspect of the present invention, in order to attain the above-mentioned object, an optical film producing method by a melt casting film producing method which comprises an extruding process of extruding a melted material containing a thermoplastic resin as a main component in a form of a film from a casting die; a pinching process of pinching the extruded film-shaped melted material (web) with pressure between a cooling roller and a touch roller; and a MD stretching process of stretching the pinched film in a lengthwise direction; the optical film producing method is characterized in that the pinched unstretched film is stretched in the film conveying direction (MD direction) by 1.1 times to 3.0 times in the MD stretching process and a film thickness T1 (μm) on a central portion in a widthwise direction of the extruded web and a film thickness T2 (μm) on both side portions in the widthwise direction of the extruded web in the extruding process are made to satisfy the following formula.

$$10 \ \mu m \leq T1-T2 \leq 200 \ \mu m$$

According to a second aspect of the present invention, the production method of the optical film is further characterized in that the stretching method of a film in the MD stretching process is a roller stretching type in which a stretching is conducted between two conveying rollers arranged in close proximity to each other and the film is heated by heater heating to be softened and subjected to the MD stretching with an actual stretching span of 50 mm or more and 300 mm or less.

According to a third aspect of the present invention, the production method of the optical film is further characterized in that in the pinching process, the touch roller is composed of an elastic roller whose peripheral surface is covered with a metallic thin plate.

According to a fourth aspect of the present invention, the production method of the optical film according to any one of the first to third aspects of the present invention is further characterized in that the thermoplastic resin is a cellulose ester.

According to a fifth aspect of the present invention, an optical film is provided which is manufactured by the production method according to any of the first to fourth aspects of the present invention.

According to a sixth aspect of the present invention, a polarizing plate is provided which is characterized by using the optical film according to any one of the first to fifth aspects of the present invention for one surface thereof.

According to a seventh aspect of the present invention, a display device is provided which is characterized by using the polarizing plate according to the sixth aspect of the present invention.

Effect of the Invention

The first aspect of the present invention is configured such that in an optical film producing method by a melt casting film producing method which comprises an extruding process of extruding a melted material containing a thermoplastic resin as a main component in a form of a film from a casting die; a pinching process of pinching the extruded film-shaped melted material (web) with pressure between a cooling roller and a touch roller; and a MD stretching process of stretching the pinched film in a lengthwise direction; the optical film producing method is characterized in that the pinched unstretched film is stretched in the film conveying direction (MD direction) by 1.1 times to 3.0 times in the MD stretching process and a film thickness T1 (µm) on a central portion in a widthwise direction of the extruded web and a film thickness T2 (µm) on both side portions in the widthwise direction of the extruded web in the extruding process are made to satisfy the following formula.

$$10 \ \mu m \leq T1-T2 \leq 200 \ \mu m$$

Therefore, according to the first aspect of the present invention, in addition to the use of a touch roller composed of elastic rollers, since controlling of a film thickness of web in casting and MD stretching by a so-called heater heating method are combined, a final film thickness configuration can be made flat even for a film having been cast in a center portion thicker film, whereby an optical having a good flatness and excellent optical characteristics can be produced. As a result, it becomes possible to provide an effect capable of being responsible sufficiently to a request to make a protection film thinner in thickness, wider in width and higher in quality for polarizing plates in recent years.

The second aspect of the present invention is configured such that the production method of the optical film is made such that the stretching method of a film in the MD stretching process is a roller stretching type in which a stretching is conducted between two conveying rollers arranged in close proximity to each other and the film is heated by heater heating to be softened and subjected to the MD stretching with an actual stretching span of 50 mm or more and 300 mm or less.

Therefore, according to the second aspect of the present invention, a final film thickness configuration can be made flat even for a film having been cast in a center portion thicker film, whereby an optical having a good flatness and excellent optical characteristics can be produced.

The third aspect of the present invention is configured such that the production method of the optical film is made such that in the pinching process, the touch roller is composed of an elastic roller whose peripheral surface is covered with a metallic thin plate.

Therefore, according to the third aspect of the present invention, since the touch roller composed of an elastic roller has proper elasticity, the touch roller may deform in accordance with the form of a film thickness of the film having been cast in a center portion thicker film. Therefore, since unevenness in pressing may hardly occur, it becomes possible to provide an effect capable of producing an optical film having a good flatness and excellent optical characteristics.

The fourth aspect of the present invention is configured such that the production method of the optical film is made such that the thermoplastic resin is a cellulose ester.

Therefore, according to the fourth aspect of the present invention, it becomes possible to provide an effect capable of producing an optical film having a good flatness and excellent optical characteristics.

The optical film according to the fifth aspect of the present invention is configured such that the optical film is manufactured by the production method according to any one of the first to fourth aspects of the present invention.

Therefore, according to the fifth aspect of the present invention, the optical film has a good flatness and excellent optical characteristics, and when the optical film is used, it becomes possible to provide an effect capable of being responsible sufficiently to a request to make a protection film thinner in thickness, wider in width and higher in quality for polarizing plates in recent years.

The polarizing plate according to the sixth aspect of the present invention is configured such that the polarizing plate employs the optical film according to the fifth aspect of the present invention for one surface thereof.

Therefore, according to the sixth aspect of the present invention, when the polarizing plate is incorporated in a display device, it becomes possible to provide an effect excellent in visibility (conspicuousness or easiness in observing a screen).

The display device according to the seventh aspect of the present invention is configured such that the display device employs the polarizing plate according to the sixth aspect of the present invention.

Therefore, according to the sixth aspect of the present invention, it becomes possible to provide an effect excellent in visibility (conspicuousness or easiness in observing a screen).

BRIEF DESCRIPTION OF THE DRAWING

FIG. 4 is an outline enlarged cross sectional view of a web (film)

EXPLANATION OF REFERENCE SYMBOLS

Figure 1:
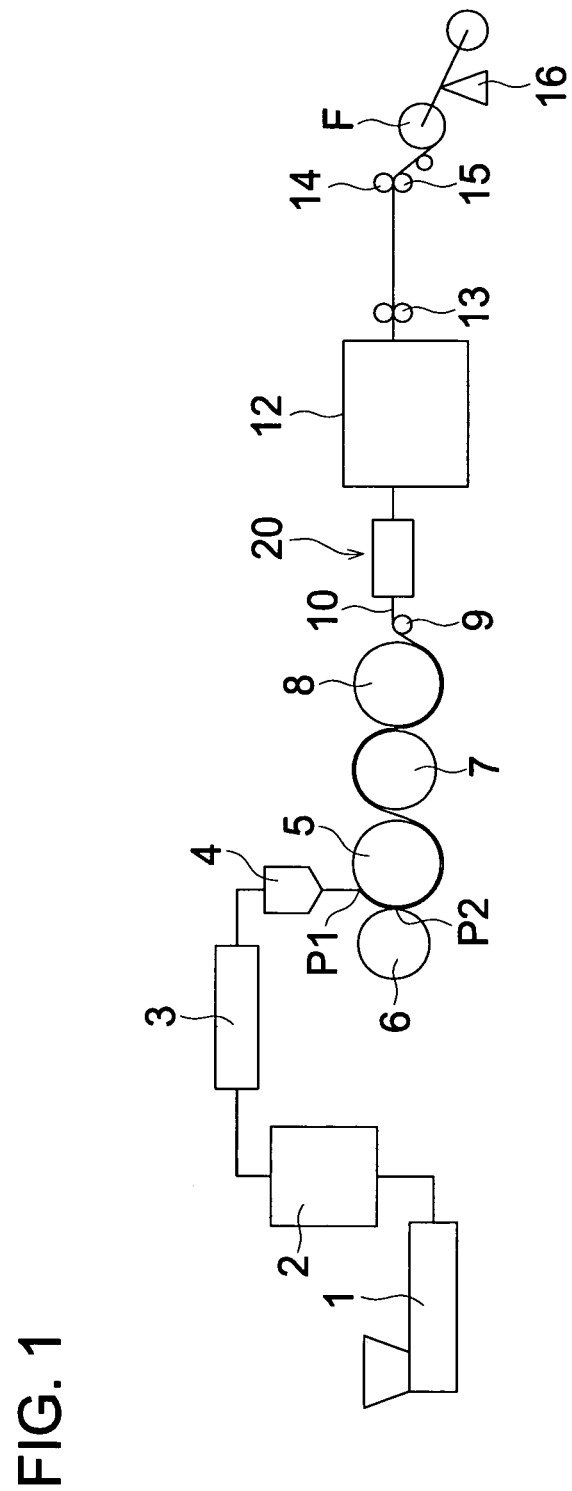
FIG. 1 is an outlined flow sheet showing an embodiment of an apparatus to conduct the producing method of an optical film of the present invention.

1: Extruder
2: Filter
3: Static mixer
4: Casting die
5: First cooling roller (first rotating member for cooling)
6: Touch roller (second rotating member for pressing)
7: Second cooling roller (third rotating member for Cooling)
8: Third cooling roller (fourth rotating member for cooling)
P1: Point that the film comes in contact with the first cooling roller surface firstly
P2: Point that the film comes in contact with the touch roller surface
9: Separating Roller
10: Film
10a: Central portion of film
10b: End portions of film
11: Warp at end portions of a web at the time of casting
12: Widthwise stretching machine
13: Slitting machine
14: Embossing ring
15: Back roller
16: Winding up apparatus
F: Optical film (supply roller)
20: MD Stretching zone
21: First preheating roller before stretching
22: Second preheating roller before stretching
23: Third preheating roller before stretching
24: Fourth preheating roller before stretching
25: Stretching and preheating roller
26: Nipping roller
27: Stretching and cooling roller
28: Nipping roller
29: First cooling roller after stretching
30: Second cooling roller after stretching
31: Third cooling roller after stretching
32: Upper heating heater
33: Lower heating heater
41: Guide roller
42: Guide roller
S: Actual stretching span

BEST MODE FOR CARRYING OUT THE INVENTION

Hereafter, the best mode for carrying out the present invention will be explained with reference to drawings. However, the present invention is not limited to embodiments in the best mode.

An optical film producing method by a melt casting film producing method according to the present invention comprises an extruding process of extruding a melted material containing a thermoplastic resin as a main component in a form of a film from a casting die; a pinching process of pinching the extruded film-shaped melted material (web) with pressure between a cooling roller and a touch roller; and a MD stretching process of stretching the pinched unstretched film in a lengthwise direction.

Conventionally, when an optical film is produced by such a touch roller method, the use of an elastic roller has been proposed in order not to leave residual stress as far as possible.

However, in recent years, when a wider width film is produced by such a touch roller method, even if an elastic touch roller is used, end portions of a film in a width direction are pinched more strongly with a pressure by the deflection of the roller as compared with a central portion. Accordingly, a difference in pressure applied to the film is caused between the central portion and the end portions in the width direction.

In order to eliminate such a pressure difference, it may be considered to (1) use a roller having more elasticity, (2) to apply a crown to a roller, and to (3) make an original film thicker at its central potion as compared with end portions. However, the elasticity of an elastic roller is limited from the viewpoint of surface roughness and processability, the crown-shaped roller is limited from the viewpoint of abrasion caused by the roller peripheral speed difference, and it is difficult to realize the method of making an original film thicker at its central potion from the viewpoint of a product specification (standard).

Then, in an optical film production method by a melt casting film producing method according to the present invention, a pinched unstretched film is stretched in the film conveying direction (MD direction) by 1.1 times to 3.0 times in a MD stretching process and a film thickness T1 (μm) on a central portion in a widthwise direction of an extruded web and a film thickness T2 (μm) on both side portions in the widthwise direction of the extruded web in an extruding process are made to satisfy the following formula.

$$10\ \mu m \leq T1 - T2 \leq 200\ \mu m$$

For example, when a wider width optical film having a width of 1500 mm or more and 4000 mm or less, preferably 1500 mm or more and 2500 mm or less is produced with a touch roller method, a difference in pressure received by a film is caused between a central portion and end portions of the film by deflection of a roller. As a result, a surface correction is not made in good order due to the difference.

The influence of this deflection can be cancelled (eliminated) by making the central portion of a film thicker by 10 to 200 μm as compared with end portions.

However, usually, a film thickness deviation in the width direction of an optical film is requested to be suppressed 5 μm or less, preferably about 2 μm. As a result of a study how to fill this gap, it has been found that when a film is stretched (MD stretching) in the lengthwise direction (conveying direction) by 1.1 times to 3.0 times in accordance with an amount of a film thickness of a central portion of a film in the widthwise direction, a final film thickness configuration in the widthwise direction can be made flat.

Here, a thickened amount of the central portion of a film in the widthwise direction can be adjusted appropriately by a roller width, a degree of elasticity of a roller, a film width, a film viscosity, and the like. When the thickened amount of the central portion of a film in the widthwise direction is less than 10 μm, it is too small as compared with an amount of deflection to obtain a sufficient effect. On the hand, when the thickened amount exceeds 200 μm, since there is a risk that an abrasion is caused on a film due to a difference in roller peripheral speed, it is nor preferable.

In the optical film production method of the present invention, the stretching method in the MD stretching process is a roller stretching method conducted between two conveying rollers arranged in close proximity to each other, and an actual stretching span is made 50 mm or more and 300 mm or less by subjecting the pinched unstretched film to the MD stretching on the state that the film is heated and softened by heating with a heater.

In this way, as the condition of the MD stretching, it is required to make an actual stretching span to be 50 mm to 300 mm, and in order to clear this actual stretching span, the roller stretching method of carrying out an MD stretching between two rollers arranged in close proximity is advantageous as compared with an oven heating method.

When the actual stretching span is less than 50 mm, a setting space of a heating device, such as a heater, is restricted and a small roller diameter is required, so that a large stretching stress cannot be obtained and it becomes an obstacle in increasing a production rate. Therefore, it is not desirable.

On the other hand, when the actual stretching span exceeds 300 mm, a widthwise shrinkage amount accompanying with the MD stretching becomes large. Therefore, since it becomes an obstacle in widening a width, it is not desirable.

Moreover, in the optical film production method according to the present invention, it is desirable that the touch roller in the pinching process is structured with an elastic roller whose peripheral surface is covered with a metallic thin plate.

That is, if the pressure by the touch roller becomes uneven, orientation unevenness occurs on a film, and this orientation unevenness becomes unevenness of contrast under the crossed Nicol prism. In order to carry out a surface correction for a film with a uniform pressure, the elastic touch roller whose peripheral surface is covered with a metal thin plate is desirable.

Hereafter, an optical film producing method according to the present invention will be explained in detail.

As preferable requirements as main materials of the optical film by the present invention, easy manufacture, good adhesive property with a polarizing film, an optically transparent and the like are listed up. In view of such requirements, a polymer film of a thermoplastic resin is specifically desirable.

As far as the aforesaid polymer film has the above-described characteristics, the polymer film is no limited specifically, however, examples of the polymer film includes cellulose ester type film such as cellulose diacetate film, cellulose triacetate film, cellulose acetate butyrate film and cellulose acetate propionate film; polyester type film, polycarbonate type film, polyaryrate type film, polysulfon (including polyethersulfon) type film, polyester film such as polyethylene terephthalate and polyethylene naphthalate, polyethylene film, polypropylene film, cellophane, polyvinylidene chloride film, polyvinyl alcohol film, ethylenevinyl alcohol film, syndiotactic polystyrene type film, polycarbonate film, cycloolefin type polymer film (Arton, manufactured by JRS Corp.), Zeonex and Zeonoa (manufactured by Nippon Zeon Corp.), polymethylpentene film, polyether ketone film, polyether ketone imide film, polyamide film, fluorine resin film, nylon film, polymethylmethacrylate film, acryl film and a glass plate. Among them, preferable are cellulose ester type film, cycloolefin polymer film, polycarbonate type film and polysulfon (including polyethersulfon) type film, and in the present invention, specifically preferably utilized are cellulose ester type resin film, and resin film including cycloolefin type addition polymer in an amount of 80% or more, from viewpoints of manufacture, a cost aspect, transparency and an adhesive property.

The materials constituting the optical film of the present invention include these cellulose resins, and if required, a stabilizer, a plasticizer, an ultraviolet absorber, a matting agent as a lubricant and retardation controlling agent. These materials may be selected appropriately in accordance with the requirements of an intended optical film.

(Cellulose Resin)

In the case that cellulose resin is used as material of an optical film of the present invention, the cellulose resin has the structure of a cellulose ester, is a single or mixed acid ester of cellulose (hereafter, merely referred to as "cellulose resin) including the structure of at least any one of an aliphatic acyl group and a substituted or unsubstituted aromatic acyl group, and is amorphous. The term "amorphous" represents the state of a solid substance not becoming any crystal with an irregular molecule arrangement on a crystal state in the form of a raw material.

Hereafter, a cellulose resin preferably used in the embodiment of the present invention will be exemplified. However, the cellulose resin should not be restricted thereto:

In the case that the cellulose resin includes an aromatic acyl group and the aromatic ring is a benzene ring, examples of the substituent of the benzene ring include a halogen atom, cyano, alkyl group, alkoxy group, aryl group, aryloxy group, acyl group, carbonamide group, sulfonamide group, ureido group, aralkyl group, nitro, alkoxy carbonyl group, aryloxy carbonyl group, aralkyloxy carbonyl group, carbamoyl group, sulfamoyl group, acyloxy group, alkenyl group, alkynyl group, alkylsulfonyl group, arylsulfonyl group, alkyloxy sulfonyl group, aryloxy sulfonyl group, alkylsulfonyloxy group and aryloxysulfonyl group.

Further, examples of the substituent of the benzene ring include —S—R, —NH—CO—OR, —PH—R, —P(—R)$_2$, —PH—O—R, —P(—R)(—O—R), —P(—O—R)$_2$, —PH(=O)—R—P(=O) (—R)$_2$, —PH(=O)—O—R, —P(=O) (—R)(—O—R), —P(=O)(—O—R)$_2$, —O—PH(=O)—R, —O—P(=O)(—R)$_2$—O—PH(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$.

In the above formulas, R represents an aliphatic group, aromatic group or heterocyclic group.

The number of substituent is 1 through 5, preferably 1 through 4, more preferably 1 through 3, still more preferably 1 or 2. When the number of the substituents to replace the aromatic ring is two or more, they can be the same or different from one another, but they can be combined to form a condensed polycyclic compound (e.g., naphthalene indene, indan, phenanthrene, quinoline, isoquinoline, chromene, chromane, phthalazine, acridine, indole and indoline).

Halogen atom, cyano, alkyl group, alkoxy group, aryl group, aryloxy group, acyl group, carbonamide group, sulfone amide group and ureido group are preferably used as the substituent. Halogen atom, cyano, alkyl group, alkoxy group, aryloxy group, acyl group and carbonamide group are more preferably used. The halogen atom, cyano, alkyl group, alkoxy group and aryloxy group are still more preferably used, and the halogen atom, alkyl group and alkoxy group are most preferably used.

The aforementioned halogen atom includes a fluorine atom, chlorine atom, bromine atom and iodine atom.

The aforementioned alkyl group may be either cyclic or branched. The alkyl group contains preferably 1 through 20 carbon atoms, more preferably 1 through 12, still more preferably 1 through 6, most preferably 1 through 4.

The aforementioned alkyl group is exemplified by methyl, ethyl, propyl, isopropyl, butyl, t-butyl, hexyl, cyclo hexyl, octyl and 2-ethylhexyl.

The aforementioned alkoxy group may be either cyclic or branched. The alkoxy group contains preferably 1 through 20 carbon atoms, more preferably 1 through 12, still more preferably 1 through 6, most preferably 1 through 4. The alkoxy group may be replaced by still another alkoxy group. The alkoxy group is exemplified by methoxy, ethoxy, 2-methoxyethoxy, 2-methoxy-2-ethoxyethoxy, butyloxy, hexyloxy and octyloxy.

The aforementioned aryl group contains preferably 6 through 20 carbon atoms, more preferably 6 through 12. The aryl group is exemplified by phenyl and naphthyl. The aforementioned aryloxy group contains preferably 6 through 20 carbon atoms, more preferably 6 through 12.

The aforementioned aryloxy group is exemplified by phenoxy and naphtoxy. The acyl group contains preferably 1 through 20 carbon atoms, more preferably 1 through 12.

The aforementioned acyl group is exemplified by formyl, acetyl and benzoyl. The aforementioned carbonamide group contains preferably 1 through 20 carbon atoms, more preferably 1 through 12.

The aforementioned carbonamide group is exemplified by acetoamide and benzamide. The aforementioned sulfone amide group contains preferably 1 through 20 carbon atoms, more preferably 1 through 12.

The aforementioned sulfone amide group is exemplified by methane sulfone amide, benzene sulfone amide and p-toluene sulfone amide. The aforementioned ureido group contains preferably 1 through 20 carbon atoms, more preferably 1 through 12.

The aforementioned ureido group is exemplified by (unsubstituted) ureido.

The aforementioned aralkyl group contains preferably 7 through 20 carbon atoms, more preferably 7 through 12. The aralkyl group is exemplified by benzyl, phenethyl and naphthylmethyl.

The aforementioned alkoxy carbonyl group contains preferably 1 through 20 carbon atoms, more preferably 2 through 12. The alkoxy carbonyl group is exemplified by methoxy carbonyl.

The aforementioned aryloxy carbonyl group contains preferably 7 through 20 carbon atoms, more preferably 7 through 12. The aryloxy carbonyl group is exemplified by phenoxy carbonyl.

The aforementioned aralkyloxy carbonyl group contains preferably 8 through 20 carbon atoms, more preferably 8 through 12. The aralkyloxy carbonyl group is exemplified by benzyloxy carbonyl.

The aforementioned carbamoyl group contains preferably 1 through 20 carbon atoms, more preferably 1 through 12. The carbamoyl group is exemplified by (unsubstituted) carbamoyl and N-methylcarbamoyl.

The aforementioned sulfamoyl group contains preferably 20 or less carbons, more preferably 12 or less carbons. The sulfamoyl group is exemplified by (unsubstituted) sulfamoyl and N-methylsulfamoyl. The aforementioned acyloxy group contains preferably 1 through 20 carbon atoms, more preferably 2 through 12.

The aforementioned acyloxy group is exemplified by acetoxy and benzoyloxy.

The aforementioned alkenyl group contains preferably 2 through 20 carbon atoms, more preferably 2 through 12. The alkenyl group is exemplified by vinyl, alyl and isopropenyl.

The aforementioned alkynyl group contains preferably 2 through 20 carbon atoms, more preferably 2 through 12. The alkynyl group is exemplified by thienyl.

The aforementioned alkyl sulfonyl group contains preferably 1 through 20 carbon atoms, more preferably 1 through 12.

The aforementioned aryl sulfonyl group contains preferably 6 through 20 carbon atoms, more preferably 6 through 12.

The aforementioned alkyloxy sulfonyl group contains preferably 1 through 20 carbon atoms, more preferably 1 through 12.

The aforementioned aryloxy sulfonyl group contains preferably 6 through 20 carbon atoms, more preferably 6 through 12.

The aforementioned alkylsulfonyloxy group contains preferably 1 through 20 carbon atoms, more preferably 1 through 12.

The aforementioned aryloxysulfonyl group contains preferably 6 through 20 carbon atoms, more preferably 6 through 12.

In the cellulose resin used in the embodiment of the present invention, when the hydrogen atom of the hydroxyl group of cellulose is a fatty acid ester aliphatic acyl group, the examples include aliphatic acyl group containing 2 through 20 carbon atoms. To put it more specifically, examples are acetyl, propionyl, butyryl, isobutyryl, valeryl, pivaloyl, hexanoyl, octanoyl, lauroyl and stearoyl.

Here, the aforementioned aliphatic acyl group includes the group containing a further substituent. The substituent can be exemplified by those mentioned as substituents of the benzene ring when the aromatic ring is a benzene ring in the aforementioned aromatic acyl group.

When a retardation film is to be manufactured as the optical film, at least one substance selected from among the cellulose acetate, cellulose propyonate, cellulose butylate, cellulose acetate propyonate, cellulose acetate butylate, cellulose acetate phthalate, and cellulose phthalate is preferably used as the cellulose resin.

Of these substances, the particularly preferred cellulose resin is exemplified by cellulose acetate, cellulose propyonate, cellulose butylate, cellulose acetate propyonate and cellulose acetate butylate.

The cellulose acetate propyonate as fatty acid ester and cellulose acetate butylate have an acyl group containing 2 through 4 carbon atoms as a substituent. Assume that the acetyl group has a replacement ratio of X, and the propionyl group or butyryl group has a replacement ratio of Y. In this case, both the following formulae (I) and (II) are preferably met at the same time. The replacement ratio is defined as the numerical value wherein the number of the hydroxyl groups replaced by the acyl group is represented in terms of glucose unit.

$$2.5 \leq X+Y \leq 3.0 \quad \text{Formula (I)}$$

$$0 \leq X \leq 2.5 \quad \text{Formula (II)}$$

$$0.3 \leq Y \leq 2.5 \quad \text{Formula (II)}$$

Particularly the cellulose acetate propyonate is preferably used.

In this case, $0.5 \leq X \leq 2.5$ and $0.5 \leq Y \leq 2.5$ are preferred, More preferably, $1.0 \leq X \leq 2.0$ and $1.0 \leq Y \leq 2.0$.

The portion not replaced by the aforementioned acyl group is normally present as a hydroxyl group. They can be synthesized by a known method.

The cellulose material of the cellulose resin used in the embodiment of the present invention can be a wood pulp or cotton linter. The wood pulp can be a conifer or a broad-leaved tree. The conifer is more preferred. From the viewpoint of separating ability at the time of film formation, use of the cotton linter is more preferred. The cellulose resins produced from these can be used in a mixed form or independently.

In the present invention, it is preferable that the number of luminescent spot foreign particles is minimal. Luminescent spot foreign particles as described herein refer to the foreign matter particles which are measured when two polarized plates are arranged at a right angle to each other (crossed Nichol state) and a cellulose ester film is placed between them. These foreign matter particles cause leakage of light that is observed at the position at right angles to the outside surface of the other polarizing plate when the retardation axis of the polarizing plate protective film is positioned so as to be parallel to the transmission axis of the polarizing plate at one light source side. The polarizing plate used for this evaluation preferably comprises protective film with no luminescent spot foreign particles and it is preferable that a glass plate is used for protecting the polarizer. It is believed that one cause of luminescent spot foreign particles is the unreacted esterified portion of the hydroxide group included in the cellulose resin. The number of luminescent spot foreign particles can be reduced by using a cellulose resin with few luminescent spot foreign particles or by reducing the number foreign matter particles by filtering the cellulose resin that has been melted by applying heat. Also, the thinner the film, the lesser the number of luminescent spot foreign particles per unit of surface area, and thus there is a tendency for the number of luminescent spot foreign particles to be less as the amount of cellulose resin included in the film is reduced.

The number of luminescent spots having a size in the range 5 to 50 µm of the film observed in a polarized crossed Nichol state is preferably 300 or less per 250 $mm^2$ area while the number of luminescent spots having a size of 50 µm or more is preferably zero. More preferably, the number of 5 to 50 µm luminescent spots is 200 or less.

When the number of luminescent spots is large, there is an adverse effect of the liquid crystal display image. In the case where the retardation film functions as the polarizing plate protection film, the presence of these luminescent spots causes birefringence turbulence and the adverse effect on the image is great.

In the case where the luminescent spot foreign particles are removed by melt filtration, a step for manufacturing the film by melt casting which includes the step of removing the luminescent spots particles is performed continuously.

For the melt casting method which includes a step of filtration of the luminescent spot foreign particles by heat melting, using the plasticizing agent and the cellulose resin described hereinafter as components is preferable when compared to the system in which the plasticizer is not added. This is in view of the fact that the melt temperature is reduced, the removal ratio of the luminescent spot foreign particles is improved and thermal decomposition is avoided. Systems including suitably blended additives described hereinafter such as ultraviolet light absorbers and matting agents may be filtered in the same manner.

Examples of the filter material include those known heretofore such as glass fiber, cellulose fiber, filter paper, and fluorine resins such as tetrafluoroethylene resin, but ceramics and metals are preferably used. Absolute filtration accuracy is preferably 50 µm or less, more preferably 30 µm or less and still more preferably 10 µm or less, and 5 µm or less is even more preferable. The filter materials may be suitably combined and used. The filter material may be the surface type or the depth type, but the depth type is less likely to block up and is thus preferable.

In a separate embodiment, before heat is applied to melt the components of the film, for at least the cellulose resin component, in at least one of the process of latter stage material synthesis and the process of obtaining the precipitate, the luminescent spot foreign particles can be removed in the solution state, via the same filtration process. At this time, it is preferable that a stabilizing agent is present in the cellulose resin, and after plasticizers which are described hereinafter or other additives such as ultraviolet light absorbers and matting agents are dissolved in the solvent, the solid part of the film components with cellulose resin as the main component can be obtained by removing the solvent and drying.

In addition, in order to achieve the solution state described above, the process of dissolving the component materials in a solvent can be done via a step of cooling at −20° C. At the time of adding one of a stabilizer, a plasticizer or other additive to the cellulose resin, there are no particular limits to the cellulose resin synthesis (preparation) step used in this invention. However, filtration may be performed in order to filter out the luminescent spot foreign particle and insoluble substances in the solution state at least up until the latter stage of the resin synthesis (preparation) step, and then the other additives may be added and then the solid components separated by removing the solvent or by acid analysis and then drying done. At the time of pelletizing, the film component materials that have been mixed as a powder can be obtained.

Uniform mixing of the constituent material other than the cellulose resin of the film constituting material with the aforementioned resin effectively provides uniform melting at the time of heating.

Polymer material and oligomer other than the cellulose resin can be selected as appropriate, and can be mixed with the cellulose resin. Such a polymer material and oligomer are preferred to have a high degree of compatibility with the cellulose resin. The transmittance is 80% or more over the entire visible range (400 nm through 800 nm) when a film is formed, preferably 90% or more, more preferably 92% or more. The purpose of mixing at least one of the polymer material and oligomer other than the cellulose resin is to improve the controllability of viscosity at the time of heating and melting, and the physical bodyties of the film subsequent to film processing. The polymer material and oligomer can be interpreted as other additives.

[Cycloolefin Polymer Film]

Cycloolefin polymer film preferably utilized in the present invention will now be explained.

Cycloolefin polymer utilized in the present invention is comprised of polymer resin containing an alicyclic structure.

Preferable cycloolefin polymer is resin in which cycloolefin is polymerized or copolymerized. Cycloolefin includes unsaturated hydrocarbon having a polycyclic structure and derivatives thereof such as norbornene, cyclopentadiene, tetracyclododecene, ethyl tetracyclododecene, ethylidene tetracyclododecene and tetracyclo[7.4.0.110,13.02,7]trideca-2,4,6,11-tetraene; and unsaturated hydrocarbon having a monocyclic structure and derivatives thereof such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene. These cycloolefin may be provided with a polar group as a substituent. A polar group includes a hydroxyl group, a carboxyl group, an alkoxyl group, an epoxy group, a glycidyl group, an oxycarbonyl group, a carbonyl group, an amino group, an ester group and a carbonic acid anhydride group, and specifically preferable is an ester group, a carboxyl group or a carbonic acid anhydride group.

Preferable cycloolefin polymer may be those in which monomer other than cycloolefin being addition copolymerized. Monomer capable of addition copolymerization includes ethylene such as ethylene, propylene, 1-butene and 1-pentene; or dien such as α-olefin-1,4-hexadiene, 4-methyl-1,4-hexadiene, 5-methyl-1,4-hexadiene and 1,7-octadiene.

Cycloolefin is prepared by an addition polymerization reaction or a metathesis open ring polymerization reaction. Polymerization is preformed in the presence of a catalyst. A catalyst for addition polymerization includes, for example, a catalyst comprising a vanadium compound and an organoaluminum compound. A catalyst for open ring polymerization includes a polymerization catalyst comprising a halogenide, nitrate or an acetylacetone compound of metal such as ruthenium, rhodium, palladium, osmium, iridium and platinum, and a reducing agent; or a polymerization catalyst comprising a halogenide or acetylacetone compound of metal such as titanium, vanadium, zirconium, tungsten and molybdenum, and an organoaluminum compound. Such as polymerization temperature and pressure are not specifically limited, however, polymerization is generally performed at a polymerization temperature of −50 to 100° C. and under a polymerization pressure of 0-490 N/cm².

Cycloolefin polymer utilized in the present invention is preferably those in which cycloolefin is polymerized or copolymerized followed by being subjected to a hydrogen addition reaction to convert unsaturated bonds in the molecule into saturated bonds. A hydrogen addition reaction is performed by blowing hydrogen in the presence of a hydrogenation catalyst well known in the art. A hydrogenation catalyst includes a homogeneous catalyst comprising a combination of a transition metal compound/an alkyl metal compound such as cobalt acetate/triethyl aluminium, neckel acetylacetonato/triisobutyl aluminum, titanocene dichloride/n-butyl lithium, zirconocene dichloride/sec-butyl lithium and tetrabutoxy titanate/dimethyl magnesium; an inhomogeneous catalyst such as nickel, palladium and platinum; and an inhomogeneous solid carrying catalyst comprising a metal catalyst held by a carrier such as nickel/silica, nickel/diatomaceous earth, nickel/alumina, palladium/carbon, palladium/silica, palladium/diatomaceous earth and palladium/alumina.

In addition, cycloolefin polymer also includes the following norbornene type polymer. Norbornene type polymer is preferably provided with a norbornene skeleton as a repeating unit, and specific examples thereof include those described in such as JP-A Nos. 62-252406, 62-252407, 2-133413, 63-145324, 63-264626 and 1-240517, Examined Japanese Patent Application Publication No. 57-8815, JP-A Nos. 5-39403, 5-43663, 5-43834, 5-70655, 5-279554, 6-206985, 7-62028, 8-176411 and 9-241484, however, is not limited thereto. Further, these may be utilized alone or in combination of at least two types.

Further, as other monomer copolymerizable with norbornene type monomer, utilized are α-olefin having a carbon number of 2-20 such as ethylene, propylene, 1-butene, 1-pentene, 1-hexene, 1-octene, 1-decene, 1-dodecene, 1-tetradecene, 1-hexadecene, 1-octadecene and 1-eicosene, and derivatives thereof; cycloolefin such as cyclobutene, cyclopentene, cyclohexene, cyclooctene and 3a,5,6,7a-tetrahydro-4,7-methano-1H-indene, and derivatives thereof; non-conjugated diene such as 1,4-hexadiene, 4-methyl-1,4-hexadiene, 5-methyl-1,4-hexadiene and 1,7-octadiene. Among them, α-olefin and ethylene are specifically preferable.

These other monomers copolymerizable with norbornene type monomer may be utilized each alone or in combination of at least two types. In the case of addition polymerization of norbornene type monomer and other monomer copolymerizable therewith, a ratio of a structural unit arising from norbornen type monomer and a structural unit arising from copolymerizable other monomer is suitably selected to be in a range of generally 30/70 to 99/1, preferably 50/50 to 97/3 and more preferably 70/30 to 95/5, based on a weight ratio.

When unsaturated bonds remaining in a polymer molecule chain are saturated by a hydrogenation reaction, the hydrogenation degree is preferably set to not less than 90%, preferably not less than 95% and specifically preferably not less than 99%, with respect to light stability and weather-proofing.

In addition, cycloolefin polymer utilized in the present invention includes such as thermoplastic saturated norbornene type resin described in paragraphs [0014] to [0019] of JP-A 5-2108, thermoplastic norbornene type resin described in paragraphs [0015] to [0031] of JP-A 2001-277430, thermoplastic norbornene type resin described in paragraphs [0008] to [0045] of JP-A 2003-14901, norbornene type resin compositions described in paragraphs [0014] to [0028] of JP-A 2003-139950, norbornene type resin described in paragraphs [0029] to [0037] of JP-A 2003-161832, norbornene type resin described in paragraphs [0027] to [0036] of JP-A 2003-195268, alicyclic structure containing polymer resin described in paragraphs [0009] to [0023] of JP-A 2003-211589 and norbornen type polymer resin or vinyl alicyclic hydrocarbon polymer resin described in paragraphs [0008] to [0024] of JP-A 2003-211588.

Specifically, such as Zeonex and Zeonoa, manufactured by Nippon Zeon Co., Ltd.; Arton manufactured by JSR Co., Ltd; Apel (such as APL 8008T, APL 6509T, APL 6013T, APL 5014DP and APL 6015T) manufactured by Mitsui Chemicals Co., Ltd. are preferably utilized.

A molecular weight of cycloolefin polymer utilized in the present invention is appropriately selected according to the application, however, it is preferred to achieve a highly balanced mechanical strength and a mold processing behavior of a molded product, when it is in a range of generally 5,000 to 500,000, preferably 8,000 to 200,000 and more preferably 10,000 to 100,000 based on a weight average molecular weight of converted polyisobutylene or polystyrene, measured by a gel permeation chromatography method.

Cycloolefin polymer film may be incorporated with an additive which can be generally blended in plastic film. Such an additive includes such as a thermal stabilizer, a light stabilizer, an ultraviolet absorbent, an antistatic agent, a sliding agent, a plastisizer and a filling agent, and the content can be selected in a range of not disturbing the object of the present invention.

A forming method of cycloolefin polymer film is not specifically limited, and either a heat fused molding method or a solution casting method can be utilized. A heat fused molding method can be classified, in further details, into such as an extrusion molding method, a press molding method, an inflation molding method, an ejection molding method, a blow molding method and a stretching molding method, however, among these methods, to prepare film being excellent in such as mechanical strength and surface precision, preferable are an extrusion molding method, an inflation molding method and a press molding method, and most preferable is an extrusion molding method. The molding condition is appropriately selected depending on an application purpose and a molding method, however, in the case of applying a heat fused molding method, cylinder temperature is appropriately set generally in a range of 150-400° C., preferably of 200-350° C. and more preferably of 230-330° C. There is a possibility of causing molding defects such as a shrink mark or distortion in film due to deteriorated fluidity when the resin temperature is excessively low, while voids or silver streaks or yellowing of film may be generated when the resin temperature is excessively high. Thickness of film is generally in a range of 5-300 μm, preferably of 10 to 200 μm and more preferably of 20 to 100 μm. Handling at accumulation becomes difficult when the thickness is excessively thin, while drying time after accumulation becomes long to deteriorate productivity when the thickness is excessively thick.

Cycloolefin polymer film is preferably has a wetting tension of the surface of preferably not less than 40 mN/m, more preferably not less than 50 mN/m and furthermore preferably not less than 55 mN/m. When the wetting tension of the surface is in the above-described range, adhesion strength between the film and polarizer film will be increased. To adjust the wetting tension of the surface, for example, it is possible to apply film with a corona discharge treatment, ozone blowing, ultraviolet ray irradiation, a flame treatment, a chemical treatment and other surface treatments well known in the art.

Thickness of a sheet before stretching is required to be approximately 50-500 μm; and thickness unevenness is preferably as small as possible and is within ±8%, preferably within ±6% and more preferably within ±4%, in the whole surface.

To make the cycloilefin polymer film described above to an optical film of the present invention, it is possible to prepare by a manufacturing method similar to the aforesaid cellulose ester film, and it is possible to prepare it at least by uniaxially stretching a sheet. Here, "uniaxially stretching" may be "substantially uniaxially stretching" corresponding to biaxially stretching, that is, for example, a sheet is stretched within a range in which the orientation of molecules is not influenced, and then the sheet is further uniaxially stretched such that molecules are oriented to a predetermined direction. It may be preferable to use a tentar device and the like for the stretching.

Thus obtained film is comprised of molecules being oriented by stretching to be provided with a desired amount of retardation. In the present invention, retardation in the plane Ro at 589 nm is preferably 30 to 100 nm and more preferably 40 to 70 nm. Further, retardation in the thickness direction Rt is 70 to 300 nm, and preferably 100 to 250 nm Retardation can be controlled by: a retardation of a sheet before stretching, a stretching ratio, a stretching temperature and a thickness of the film oriented by stretching. When a sheet before stretching has a constant thickness, since there is a tendency that an absolute value of retardation is increased as the stretching ratio of film is large, stretching oriented film having a desired retardation can be obtained by adjusting the stretching ratio.

The smaller is scattering of retardation, the more preferable, and cycloolefin film of the present invention has a scattering of retardation at a wavelength of 589 nm as small as generally within ±50 nm, preferably within ±30 nm and more preferably within ±20 nm.

Variation of in-plane retardation or retardation in the thickness direction, or unevenness in thickness can be minimized by the use of a sheet having a smaller retardation variation or a smaller thickness variation before stretching and by a technique to make stress to be uniformly applied to the sheet when the sheet is stretched. For this purpose, the sheet is preferably stretched under a uniform temperature distribution, that is, in an environment of controlled temperature of within ±5° C., preferably within ±2° C. and specifically preferably within ±0.5° C.

(Polycarbonate Type Film)

There are various polycarbonate type resins utilized to prepare polycarbonate type film; aromatic polycarbonate is preferable with respect to chemical properties and physical properties and specifically preferable is bisphenol A type polycarbonate. Among them, furthermore preferable resin includes those utilizing a bisphenol derivative, in which such as a benzene ring, a cyclohexane ring or an aliphatic hydrocarbon group is introduced in bisphenol A, however, specifically preferable is polycarbonate, which is prepared by utilizing a derivative introduced with these groups asymmetrically against the central carbon, having a structure with reduced anisotropy in a unit molecule. For example, preferable is polycarbonate prepared by utilizing bisphenol A in which tow methyl groups of the central carbon are substituted by benzene rings, or bisphenol A in which one hydrogen of each benzene ring is substituted by a methyl group or a phenyl group, asymmetrically against the central carbon.

Specifically, preferable resin is those prepared from 4,4'-dihydroxydiphenylalkane or a halogen substitutent thereof by a phosgene method or an ester exchange method, and includes such as 4,4'-dihydroxydiphenylmethane, 4,4'-dihydroxydiphenylethane and 4,4'-dihydroxydiphenylbutane.

In the retardation film comprising polycarbonate resin utilized in the present invention, transparent resin such as polystyrene type resin, methylmethacrylate type resin or cellulose acetate type resin may be utilized in combination by mixing, or polycarbonate resin may be accumulated on at least one surface of cellulose acetate type film.

Preparation method of polycarbonate type film utilizable in the present invention is not specifically limited, and any one of film by an extrusion method, film by a solvent casting method and film by a calendar method may be utilized. In the present invention, a polycarbonate film can be obtained by the same manufacturing method as the preferable manufacturing method for the cellulose ester film and by employing a uniaxial stretching method or a biaxial stretching method.

Polycarbonate type film utilized in the present invention is preferably has a glass transition temperature (Tg) of not lower than 110° C. and a water absorbability (a value measured under a condition in water of 23° C. for 24 hours) of not more than 0.3%. More preferable is to utilize those having a Tg of not lower than 120° C. and a water absorbability of not more than 0.2%.

At least one of the stabilizers should be added to the film constituting material before or at the time of heating and melting of the aforementioned cellulose resin. The stabilizer is required to function without being decomposed at the melting temperature for film formation.

The stabilizer includes a hindered phenol antioxidant, acid-acceptor, hindered amine light stabilizer, peroxide decomposer, radical acceptor, metal deactivator and amines. They are disclosed in the Japanese Non-Examined Patent Application Publication (Tokkaihei) 3-199201, Japanese Non-Examined Patent Application Publication (Tokkaihei) 5-1907073, Japanese Non-Examined Patent Application Publication (Tokkaihei) 5-194789, Japanese Non-Examined Patent Application Publication (Tokkaihei) 5-271471, and Japanese Non-Examined Patent Application Publication (Tokkaihei) 6-107854.

The stabilizer is used to prevent oxidation of the film constituting material, to capture the acid produced by decomposition, to prevent or inhibit decomposition caused by radical species due to light or heat, and to check generation of volatile component caused by the degeneration represented by coloring or a reduction in molecular weight or material decomposition, including the decomposition reaction yet to be clarified. To be more specific, addition of stabilizer into the film constituting material is very effective in checking or preventing generation of the volatile component resulting from degeneration and decomposition of the film constituting material other than the stabilizer. Further, the stabilizer itself is required not to generate a volatile component in the range of temperature for melting the film constituting material.

In the meantime, if the film constituting material is heated and melted, the degree of decomposition is increased. This composition may reduce the strength of the aforementioned constituting material resulting from coloring or reduction in the molecular weight. Further, the decomposition of the film constituting material may be accompanied by production of volatile components.

In the film constituting material, in order to avoid deterioration of material and to reduce moisture absorbency, the constituent materials can be made into one or more kinds of pellets and stored in the form of pellets. The formation of pellets can improve the mixing ability and compatibility of molten material at the time of heating, and secure an optical uniformity of an obtained film.

At the time of heating and melting the film constituting material, the presence of a stabilizer is preferred, because the stabilizer minimizes the reduction in strength caused by deterioration and decomposition of the material, or maintains the strength intrinsic to the material.

When the retardation film is manufactured, addition of a stabilizer is preferable. In the process of providing retardation as a retardation film in the production of a film, the stabilizer minimizes reduction in the deterioration of the strength of the aforementioned film constituting material, or maintains the strength inherent to the material. If the film constituting material becomes brittle by considerable deterioration, breakage tends to occur in the step of orientation at the time of film formation. This is because retardation value as a retardation film cannot be ensured in some cases.

Further, the presence of the stabilizer is important because it reduces generation of a colored object in the visible light area at the time of heating and melting, and reduces or removes the factors undesirable to the retardation film such as transmittance or haze value caused by entry of the volatile component into the film. The haze value is less than 1%, preferably less than 0.5%.

In the film constituting material storage or film making process, deterioration may be caused by the presence of oxygen in the air. In this case, means can be provided to reduce the density of oxygen in the air, in addition to the method of using the stabilizing function of the stabilizer. Such means can be exemplified by the known technology of using the nitrogen or argon as an inert gas, deaeration under reduced pressure or under vacuum, and operation in an enclosed environment. At least one of these three methods can be used together with the method wherein the aforementioned stabilizer is present. When the probability of the film constituting material contacting the oxygen in the air is reduced, deterioration of the aforementioned material can be reduced.

When the retardation film is used as a polarizing plate protective film, the aforementioned stabilizer should be incorporated in the film constituting material in order to improve the chronological keeping quality with respect to the polarizer constituting the polarizing plate and polarizing plate.

In the liquid crystal display apparatus using a polarizing plate, presence of the aforementioned stabilizer in the retardation film improves the chronological keeping quality of the retardation film and provides the optical compensation function for a long period of time.

A known compound can be used as a hindered phenol antioxidant compound useful for stabilization at the time of heating and melting a film constituting material, and is exemplified by a 2,6-dialkyl phenol derivative compound, such as a compound disclosed in the 12th through 14th columns in the specification of the U.S. Pat. No. 4,839,405. Examples of these compounds include a compound represented by the following formula.

Concrete examples of the hindered phenol compound include n-octadecyl 3-(3,5-di-t-butyl-4-hydroxyphenyl)propionate, n-octadecyl 3-(3,5-di t-butyl-4-hydroxyphenyl)acetate, n-octadecyl 3,5-di t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neododecyl 3-(dodecyl β-(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-t-butyl-4-hydroxyphenyl)propionate, 2-(n-octyl)ethyl 3,5-di-t-butyl-e-hydroxybenzoate, 2-(n-octyl) ethyl 3,5-di-t-butyl-4-hydroxyphenylacetate, 2-(n-octadecylthio)ethyl 3,5-di-t-butyl-4-hydroxyphenyl-acetate, 2-(n-octadecylthio)ethyl 3,5-di-t-butyl-4-hydroxybenzoate, 2-(2-hydroxyethylthio)ethyl 3,5-di-t-butyl-4-hydroxybenzoate, diethylglycol bis-(3,5-di-t-butyl-4-hydroxyphenyl) propionate, 2-(n-octadecylthio)ethyl 3-(3,5-di-t-butyl-4-hydroxyphenyl)propionate, stearylamido N,N-bis[ethylene 3-(3,5-di-t-butyl-4-hydroxyphenyl)-propionate], n-butyl-imino N,N-bis-[ethylene 3-(3,5-di-t-butyl-4-hydroxyphenyl) propionate], 2-(2-stearoylo-xyethylthio)ethyl 3,5-di-t-butyl-4-hydroxybenzoate, 2-(2-stearoylo-xyethylthio)ethyl 7-(3-methyl-5-t-butyl-4-hydroxyphenyl)heptanoate, 1,2-propylene glycol bis-[3-(3,5-di-t-butyl-4-hydroxyphenyl) propionate], ethylene glycol bis-[3-(3,5-di-t-butyl-4-hydroxyphenyl)-propionate], neopentyl glycol bis-[3-(3,5-di-t-butyl-4-hydroxyphenyl)propionate], ethylene glycol bis-(3,5-di-t-butyl-4-hydroxyphenylacetate), glycerol 1-n-octadecanoate-2,3-bis-(3,5-di-t-butyl-4-hydroxyphenylacetate), pentaerythrytol tetrakis[3-(3,5-di-t-butyl-4'-hydroxyphenyl)propionate], 1,1,1-trimethylolethane tris[3-(3,5-di-t-butyl-hydroxyphenyl) propionate], sorbitol hexa-[3-(3,5-di-t-butyl-hydroxyphenyl) propionate], 2-hydroxyethyl 7-(3,5-di-t-butyl-hydroxyphenyl)propionate, 2-stearoyloxyethyl 7-(3,5-di-t-butyl-hydroxyphenyl)-heptanoate, 1,6-n-hexanediol bis-[(3,5-di-t-butyl-4-hydroxyphenyl)propionate] and pentaerythrytol tetrakis(3,5-di-t-butyl-4-hydroxycinnamate).

The above-described type hindered phenol antioxidant is, for example, available on the market under the commercial name of Irganox 1076 and Irganox 1010 of Ciba Specialty Chemicals.

As an acid acceptor useful for stabilization at the time of heating and melting a film constituting material, a compound including an epoxy compound described in the specification of the U.S. Pat. No. 4,137,201 is preferably used. Such a compound is already known in the aforementioned technical field. It is exemplified by the diglycidyl ether of various polyglycols; polyglycol induced by condensation of about 8 through 40 moles of ethylene oxide per mole of polyglycol in particular; a metallic epoxy compound such as diglycidyl ether of glycerol (e.g. the compound having been used so far together with polyvinyl chloride polymer composition in the polyvinyl chloride polymer composition); epoxidized ether condensed product; diglycidyl ether of the bisphenol A (e.g., 4,4'-dihydroxydiphenyl dimethyl methane); epoxidized unsaturated fatty acid ester (particularly, the alkyl ester containing about 4 through 2 carbon atoms of the fatty acid of this carbon atom having about 2 through 22 (e.g., butyl epoxy stearate)); and various epoxidized long chain fatty acid triglyceride (e.g., epoxidized plant oil and other unsaturated natural oil (sometimes called the epoxidized natural glyceride or unsaturated fatty acid wherein these fatty acid generally contain 12 through 22 carbon atoms)) represented and illustrated by the compound of epoxidized soy bean oil).

Further employable acid capturing agent includes those described in Tokkai Hei 5-194788, paragraphs 87 to 105.

A known compound can be used as the hindered amine light stabilizer (HALS) contributing to the stabilization at the time of heating and melting of the film constituting material. To put it more specifically, it is exemplified by 2,2,6,6-tetraalkyl piperidine compound, the acid added salt thereof, or the complex between the same and metallic compound, as described in the 5th through 11th columns in the Specification of the U.S. Pat. No. 4,619,956 and in the 3rd through 5th columns in the Specification of the U.S. Pat. No. 4,839,405. Such the compounds include a compound represented by the following formula.

Concrete examples of the hindered amine photo-stabilizer include 4-hydroxy-2,2,6,6-tetramethyl-piperidine, a allyl-4-hydroxy-2,2,6,6-tetramethyl-piperidine, 1-benzyl-4-hydroxy-2,2,6,6-tetramethyl-piperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-saliciloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylamleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethylpiperidine-4-yl)-phthalate, 1-acetyl-2,2,6,6-tetramethylpiperidine-4-yl)-acetate, trimellitic acid ester of tri-(2,2,6,-tetramethyl-piperidine-4-yl), 1-acryloyl-4-benzyloxy-2,2,6,6-tetramethyl-piperidine, di-(1,2,2,6,6-pentamethylpiperidine-4-yl) dibutylmalonate, di-(1,2,3,6-tetramethyl-2,6-diethylpiperidine-4-yl) dibenzylmlonate, dimethyl-bis-(2,2,6,6-tetramethylpieridine-4-oxy)-silane, tris-(1-propyl-2,2,6,6-tetramethylpieridine-4-yl) phosphite, tris-(1-propyl-2,2,6,6-tetramethylpieridine-4-yl) phosphate, N,N'-bis-(2,2,6,6-tetramethylpieridine-4-yl)-hexamethylene-1,6-di-acetoamide, 1-acetyl-4-(N-cyclohexylacetamido)-2,2,6,6-tetramethylpieridine, 4-benzylamino-2,2,6,6-tetramethyl-pieridine, N,N'-bis-(2,2,6,6-tetramethyl-pieridine-4-yl)-N,N'-dibutyl-adipamide, N,N'-bis-(2,2,6,6-tetramethylpieridine-4-yl)-N,N'-dicyclohexyl-(2-hydroxypropylene), N,N'-bis-(2,2,6,6-tetramethyl-pieridine-4-yl)-p-xylenediamine, 4-(bis-2-hydroxyethyl)-amino-1,2,2,6,6-pentamethylpiperidine, 4-methacrylamido-1,2,2,6,6-pentamethylpiperidine and methyl α-cyano-β-methyl-β-[N-2,2,6,6-tetramethylpieridine-4-yl]]-amino-acrylate.

At least one of the stabilizer types can be selected and added. The amount to be added is preferably 0.001 or more percent by mass without exceeding 5 percent by mass with respect to the mass of cellulose resin, more preferably 0.005 or more percent by mass without exceeding 3 percent by mass, still more preferably 0.01 or more percent by mass without exceeding 0.8 percent by mass.

If the amount of the stabilizer to be added is insufficient, the advantages of the stabilizer cannot be used effectively due to a lower effect of stabilization at the time of heating and melting. If the amount of the stabilizer to be added is excessive on the other hand, film transparency will be reduced for the compatibility with resin, and the film will become brittle. This must be avoided.

The stabilizer is preferably mixed before melting the resin. A mixer may be used for this purpose, or mixing may be made in the cellulose resin preparation phase, as described above. It is also possible to make such arrangements that mixing is made at a temperature of the melting point of the resin or more without exceeding that of the stabilizer, and only the stabilizer is melted and is adsorbed on the surface of resin.

Addition of the plasticizer is preferred for the purpose of improving the film quality such as improving mechanical property, providing softness and water repellency, and reducing the moisture transmittance.

In the melt-casting film formation method practiced in the embodiment of the present invention, use of a plasticizer is intended to reduce the film constituting material melting temperature below than the glass transition temperature of the single cellulose resin to be used, or to reduce the viscosity for melting the film constituting material including the plasticizer below that of the single cellulose resin at the same heating temperature.

The film constituting material melting temperature in the sense in which it is used here in the embodiment of the present invention refers to the temperature at which the material is heated when the aforementioned material is fluidized by heating.

When only the cellulose, resin is used singly and the temperature is lower than the glass transition temperature, the material is not fluidized to form a film. In the case of the aforementioned resin, however, the modulus of elasticity or viscosity is reduced by absorption of heat at the glass transition temperature or more, and the material is fluidized. To lower the film constituting material melting temperature, the plasticizer to be added is required have a melting point or a glass transition temperature lower than the glass transition temperature of the cellulose resin. This is preferred to achieve the aforementioned object.

For example, a phosphoric acid ester derivative and carboxylic acid ester derivative are preferably used as a plasticizer. It is also preferred to use the polymer obtained by polymerization of the ethylenic unsaturated monomer having a weight average molecular weight of 500 or more without exceeding 10,000 mentioned in the Japanese Non-Examined Patent Application Publication (Tokkai) 2003-12859, the acryl based polymer, the acryl based polymer having an aromatic ring on the side chain, or acryl based polymer having the cyclohexyl group on the side chain.

The phosphoric acid ester derivative is exemplified by triphenyl phosphate, tricresyl phosphate and phenyldiphenylphosphate.

The carboxylic acid ester derivative is exemplified by phthalic acid ester and citric acid ester. The phthalic acid ester derivative is exemplified by dimethylphthalate, diethylphthalate, dicyclohexyl phthalate, dioctylphthalate and diethylhexylphthalate. The citric acid ester is exemplified by citric acid acetyl triethyl and citric acid acetyl tributyl.

Other substances preferably used for the aforementioned purpose are butyl oleate, methylacetyl ricinoleate, dibutyl sebacate, triacetin, trimethylol propane tribenzoate and others. Alkylphthalylalkylglycolate is also used for this purpose. The alkyl of the alkylphthalyl alkylglycolate is an alkyl group containing 1 through 8 carbon atoms. The alkylphthalyl alkylglycolate is exemplified by methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalylmethyl glycolate, ethylphthalylpropyl glycolate, propylphthalyl ethylglycolate, methylphthalyl propylglycolate, methylphthalyl butylglycolate, ethylphthalylbutyl glycolate, butylphthalyl methylglycolate, butylphthalyl ethylglycolate, propyl phthalyl butylglycolate, butylphthalyl propylglycolate, methylphthalyl octylglycolate, ethylphthalyloctyl glycolate, octylphthalyl methylglycolate and octylphthalyl ethylglycolate. Methylphthalyl methylglycolate, ethylphthalyl ethylglycolate, propylphthalyl propylglycolate, butylphthalyl butylglycolate and octylphthalyl octylglycolate are preferably used. In particular, ethylphthalyl ethylglycolate is preferably used. Further, two or more of the alkylphthalyl alkylglycolate and others can be mixed for use.

The amount of the plasticizer to be added is preferably 0.5 percent by mass or more through less than 20 percent by mass, with respect to the resin constituting the film constituting material, more preferably 1 percent by mass or more through less than 11 percent by mass.

The aforementioned plasticizer is preferred not to generate a volatile component at the time of heating and melting. To put it more specifically, the nonvolatile phosphoric acid ester described in the Japanese Non-Examined Patent Application Publication (Tokuhyohei) 6-501040 can be mentioned as an example. The arylene bis(diaryl phosphate) ester and trimethylol propane tribenzoate as the above illustrated compound can be preferably used, without being restricted thereto. When the volatile component is subjected to the thermal decomposition of the plasticizer, the thermal decomposition temperature Td (1.0) of the plasticizer is defined as the temperature at the time of reduction by 1.0 percent by mass. This requires that the temperature is higher than the film constituting material melting temperature (Tm). This is because, in order to meet the purpose of addition, the amount of the plasticizer to be added to the cellulose resin is greater than that of other film constituting material, and the presence of the volatile component has a serious impact on the deterioration of the quality of the film to be obtained. It should be noted that thermal decomposition temperature Td (1.0) can be measured by the commercially available differential thermogravimetric analyzer (TG-DTA).

For the purpose of preventing the polarizer and display apparatus from being deteriorated by ultraviolet rays, the ultraviolet absorber is characterized by excellent function of absorbing the ultraviolet rays having a wavelength of 370 nm or less. Viewed from the liquid crystal display performance, the absorber is preferred to absorb a smaller amount of the visible light with a wavelength of 400 nm or more.

The ultraviolet absorber is exemplified by an oxybenzophenone based compound, benzotriazole based compound, salicylic acid ester based compound, benzophenone based compound, cyanoacrylate based compound and nickel complex salt based compound. The benzophenone based compound and benzotriazole based compound of less coloring are preferably used. It is also possible to use the ultraviolet absorber mentioned in the Japanese Non-Examined Patent Application Publication (Tokkaihei) 10-182621 and Japanese Non-Examined Patent Application Publication (Tokkaihei) 8-337574 and the polymer ultraviolet absorber described in the Japanese Non-Examined Patent Application Publication (Tokkaihei) 6-148430.

The benzotriazole based ultraviolet absorber is exemplified by mixtures of 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimide methyl)-5'-methylphenyl) benzotriazole, 2,2-methylene bis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2H-benzotriazole-2-yl)-6-(straight chain and side chain dodecyl)-4-methylphenol, octyl-3-[3-tert-butyl-4-hydroxy-5-(chloro-2H-benzotriazole-2-yl) phenyl]propyonate and 2-ethylhexyl-3-[3-tert-butyl-4-hydroxy-5-(5-chloro-2H-benzotriazole-2-yl) phenyl]propyonate, without being restricted thereto.

TINUVIN 109, TINUVIN 171, TINUVIN 326, TINUVIN 928 (by Ciba Specialty Chemicals K.K.) can be mentioned as a commercially available.

The benzophenone based compound can be exemplified by 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenyl methane), without being restricted thereto.

The amount of the ultraviolet absorber to be added is 0.1 through 20 percent by mass with respect to the mass of cellulose resin, preferably 0.5 through 10 percent by mass, more preferably 1 through 5 percent by mass. Two or more types thereof can be added in combination.

The optical film can be provided with a matting agent to improve sliding bodyty, transportability and easy winding.

The matting agent is preferably made of particles as fine as possible. It is exemplified by inorganic particles and crosslinking polymer particles of silicon dioxide, titanium dioxide, aluminum oxide, zirconium oxide, calcium carbide, karyon, talc, sintered calcium silicate, hydrated calcium silicate, aluminum silicate, magnesium silicate and calcium phosphate.

Of the aforementioned substances, silicon dioxide reduces the degree of film haze, and is preferably used. The particles such as silicon dioxide are often surface-treated by an organic substance. They reduce the film haze and are preferably used.

The surface-treated organic substance preferably used is exemplified by halosilane, alkoxy silane, silazane and siloxane. When the average particle size of the particle is, greater, the sliding bodyty effect is greater. Conversely, when the average particle size of the particle is smaller, the transparency is superior. Further, the average size of the secondary particle is 0.05 through 1.0 μm. The average size of the secondary particle is preferably 5 through 50 nm, more preferably 7 through 14 nm. The aforementioned particle is preferably used to form projections and depressions having a thickness of 0.01 through 1.0 μm on the film surface. The amount of particles contained therein is preferably 0.005 through 0.3 percent by mass with respect to cellulose resin.

The particle of silicon dioxide is exemplified by AEROSIL 200, 200V, 300, R972, R972V, R974, R202, R812, OX50, and TT600 (by Nippon Aerosil Co., Ltd.). Of these, AEROSIL 200V, R972, R972V, R974, R202 and R812 are preferably used. Two or more of these particles can be used. When two or more of these particles are used, they can be mixed for use in a desired mixing ratio. In this case, the mass ratio of the particles having different average particle size and different materials, for example, the mass ratio of AEROSIL 200V and R972V is 0.1 to 99.9 through 99.9 to 0.1 is preferred for use.

The matting agent is preferably added before the film constituting material is melted, or is preferably included in the film constituting material in advance. For example, after the particles dispersed in a solvent in advance and other additives such as cellulose resin and/or plasticizer and ultraviolet absorber have been mixed and dispersed, the solvent is volatilized. Alternatively, the matting agent is included in the film constituting material in advance by precipitation method. Use of such a film constituting material provides uniform dispersion of the matting agent in the cellulose resin.

Another object of the particles in the film used as a matting agent is to improve the strength of the film as another object.

For example, when a retardation film is manufactured as an optical film, the retardation inhibitor can be added to adjust the retardation. As described in the Specification of European Patent 911,656A2, the aromatic compound having two aromatic rings can be used as a retardation inhibitor. Two or more types of aromatic compounds can be used in combination. In addition to the aromatic hydrocarbon ring, the aromatic ring of the aforementioned aromatic compound includes an aromatic heterocycle. The aromatic heterocycle is particularly preferred. The aromatic heterocycle is generally an unsaturated heterocycle, and 1,3,5-triazine ring is particularly preferred.

When the stabilizer, plasticizer and the aforementioned other additives are added to the cellulose resin, the total amount including them should be 1 percent by mass or more without exceeding 30 percent by mass with respect to the mass of the cellulose resin, preferably 5 through 20 percent by mass.

In the melting and film making process, the film constituting material is required to produce only a small amount of volatile component or no volatile component at all. This is intended to reduce or avoid the possibility of foaming at the time of heating and melting, thereby causing a defect inside the film or deterioration in the flatness on the film surface.

When the film constituting material is melted, the percentage of the volatile component content is 1 percent by mass or less, preferably 0.5 percent by mass or less, more preferably 0.2 percent by mass or less, still more preferably 0.1 percent by mass or less. In the embodiment of the present invention, reduction in heating from 30° C. to 250° C. is measured and calculated using a differential thermogravimetric analyzer (TG/DTA200 by Seiko Electronic Industry Co., Ltd.). This amount is used to represent the amount of the volatile component contained.

Before film formation or at the time of heating, the aforementioned moisture and volatile component represented by the aforementioned solvent is preferably removed from the film constituting material to be used. It can be removed according to a known drying technique. Heating technique, reduced pressure technique or heating/pressure reduction technique can be utilized. The removing operation can be done in the air or under the atmosphere where nitrogen is used as an inert gas. When the aforementioned known drying technique is used, the temperature should be in such a range that the film constituting material is not decomposed. This is preferred to maintain satisfactory film quality.

Drying before formation of a film reduces the possibility of volatile components being generated. It is possible to dry the resin singly or to dry after separation into a mixture or compatible substance between the resin and at least one of the film constituting materials other than resin. The drying temperature is preferably 100° C. or more. If the material to be dried contains a substance having a glass transition temperature, the material may be welded and may become difficult to handle when heated to the drying temperature higher than the glass transition temperature thereof. Thus, the drying temperature is preferably below the glass transition temperature. If a plurality of substances have glass transition temperatures, the lower glass transition temperature is used as a standard. This temperature is preferably 100° C. or more without exceeding (glass transition temperature−5) ° C., more preferably 110° C. or more without exceeding (glass transition temperature−20) ° C. The drying time is preferably 0.5 through 24 hours, more preferably 1 through 18 hours, still more preferably 1.5 through 12 hours. If the drying temperature is too low, the volatile component removal rate will be reduced and the drying time will be prolonged. Further, the drying process can be divided into two steps. For example, the drying process may contain two steps; a preliminary drying step for material storage and an immediately preceding drying step to be implemented immediately before film formation through one week before film formation.

The melt-casting film formation method can be classified into molding methods for heating and melting. It is possible to use the melt extrusion molding method, press molding method, inflation method, injection molding method, blow molding method and orientation molding method. Of these, the melt extrusion method is preferred in order to ensure an optical film characterized by excellent mechanical strength and surface accuracy. The following describes the film manufacturing method as an embodiment of the present invention with reference to the melt extrusion method.

Figure 2:
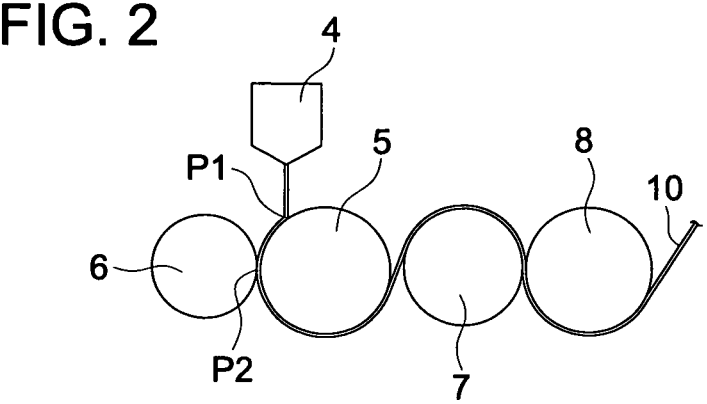
FIG. 2 is a principal part-enlarged flow sheet of a producing apparatus shown in FIG. 1 and is an enlarged view of a part from a casting die to a cooling roller.

FIG. 1 is a schematic flow sheet of an embodiment of the device for performing the method for manufacturing the optical film of this invention. FIG. 2 is an exploded view of the portion from the cast die to the cooling rollers.

FIG. 2 is an embodiment in which the point (P1) when the film first contacts the first cooling roller 5 surface and the point (P2) when the film contacts the touch roller 6 surface is different. However, depending on the case, there is a case that the point (P1) when the film first contacts the first cooling roller 5 surface and the point (P2) when the film contacts the touch roller 6 surface is the same.

In these embodiments, after the film material comprising the cellulose resin is mixed, melt extrusion is performed from the cast die 4 to the first cooling roller 5 using the extruder 1, and the melted film is brought in external contact with the first cooling roller 5 and also pressed with a prescribed force to the first cooling roller 5 using the touch roller 6. Furthermore, the film is successively brought in external contact with the second cooling roller 7 and the third cooling roller 8 to contact a total of three cooling rollers, and thereby perform hardening by cooling, and then the film is peeled using the peeling roller. The film 10 that is peeled is held at both ends by a stretching device 12 and stretched in the width direction and then wound by the winding device 16.

A film (resin mixture) that has been extruded from the casting die 4 is cooled by at least two rotating bodies having a cooling function and then surface correction is done. The rotating member that the film that has been extruded from the casting die 4 first contacts is defined as the first rotating member, and that which it contacts second is defined as the second rotating member. That is to say, the first cooling roller 5 corresponds to the first rotating member and the touch roller 6 corresponds to the second rotating member. However, the first rotating member and second rotating member of this invention are not limited to rollers and may be drums, belts or the like.

Further, the temperature of the first cooling roller 5 is made equal to or less than the glass transition temperature (Tg) of a resin mixture and equal to or more than the melting point of the additive agent.

The touch roller 6 is a rotating member used for the purpose of nipping and pressing a film in the direction to the first cooling roller 5 from the opposite side of the first cooling roller (the first rotating member for cooling) 5 in relation to the film.

The surface of the touch roller 6 is preferably metal and the thickness is 1 mm to 10 mm. The thickness is more preferably 2 mm to 6 mm. The surface of the second rotating member is subjected to treatment such as chrome plating and preferably has a surface roughness of 0.2 S or less. The surface of the obtained film will be smooth to the extent that the roller surface is smooth.

In the optical film production method according to the present invention, it is desirable that in the pinching process, the touch roller 6 is composed of an elastic touch roller whose peripheral surface is covered with a metal thin plate.

That is, if the pressure by the touch roller becomes uneven, orientation unevenness occurs on a film, and this orientation unevenness becomes unevenness of contrast under the crossed Nicol prism. In order to carry out a surface correction for a film with a uniform pressure, as mentioned above, the elastic touch roller whose peripheral surface is covered with a metal thin plate is desirable.

The metal material forming the surface of the touch roller 6 is required to be flat and durable and have suitable elasticity. Carbon steel, stainless steel, titanium and nickel manufactured by electroforming and the like are preferably used. In addition, surface treatment such as hard chrome plating, nickel plating and crystalline chrome plating or ceramic spraying and the like are preferably carried out in order to impart surface roughness and to improve peeling from the resin. The surface that has been subjected to surface processing is preferably further to subjected to polishing such that surface roughness in the above range.

The touch roller 6 has a double structure of an outer cylinder and an inner cylinder made of metal, and the double cylinder preferably has a space such that cold fluid can flow through.

The inner cylinder is preferably made of a metal that is light and rigid such as carbon steel, stainless steel, aluminum, titanium, or the like. Rotational vibration of the roller can be controlled by the inner cylinder provided with rigid. The thickness of the inner cylinder is sufficiently rigid when it is 2 to 10 times the thickness of the outer cylinder. The inner cylinder may be also covered with an elastic material made of resin such as silicone, fluorine rubber and the like.

The structure of the space in which the cold fluid flows should be such that the temperature of the roller surface can be controlled to be uniform, and for example, temperature control can be done by alternating flow back and forth in the width direction or causing the flow to be spiral thus causing temperature distribution on the roller surface to be low. The cold fluid used is not particularly limited and water or oil may be used depending on the temperature region.

In this invention, the touch roller 6 being the second rotating member is preferably a drum in which the outer diameter at the center is larger than the outer diameter at both ends. The touch roller is generally one that presses the film at both ends using a pressurizing means, but because the touch roller will flex in this case, the phenomenon occurs whereby the pressing is greater as the end of the roller is approached. By forming the roller as a drum, highly uniform pressing is possible.

In this invention, the diameter of the touch roller 6 being the second rotating member is preferably in the range 200 mm to 500 mm. The effective width of the touch roller 6 must be wider than the width of the film to be nipped. With the difference between the diameter at the center of the touch roller 6 and the diameter at the end (hereafter, called the crowning amount), it becomes possible to prevent unevenness such as streak and the like which occurs at the center of the film. The crowning amount is preferably in the range from 50 μm to 300 μm.

The first cooling roller 5 and the touch roller 6 are positioned to be opposite to each other across the film surface so as to nip the film between them. The first cooling roller 5 and the touch roller 6 come in surface contact or line contact with a film.

In the optical film manufacturing method as an embodiment of the present invention, melt extrusion conditions can be the same as those used for the thermoplastic resin including other polyesters. In this case, the material is preferably dried in advance. A vacuum or pressure reduced dryer and a dehumidified hot air dryer is preferably used to dry so that the moisture will be 1000 ppm or less, more preferably 200 ppm or less.

For example, the cellulose ester based resin dried by hot air, under vacuum or under reduced pressure is extruded by an extruder 1, and is melted at an extrusion temperature of about 200 through 300° C. This material is then filtered with a leaf disk type filter 2 or the like to remove foreign substances.

When the material is introduced from the supply hopper (not illustrated) to the extruder 1, it is preferred to create a vacuum, pressure reduced environment or inert gas atmosphere, thereby preventing decomposition by oxidation.

If such as additive as a plasticizer is not mixed in advance, it can be added and kneaded during the extrusion process in the extruder. A mixing apparatus such as a static mixer 3 is preferably used to ensure uniform addition.

Resin such as cellulose resin and additives such as a stabilizer to be added as required are mixed preferably before melting. The cellulose resin and stabilizer are more preferably mixed first. A mixer may be used for mixing. Alternatively, mixing may be done in the cellulose resin preparation process, as described above. When the mixer is used, it is possible to use a general mixer such as a V-type mixer, conical screw type mixer, horizontal cylindrical type mixer, and the like.

As described above, after the film constituting material has been mixed, the mixture can be directly melted by the use of the extruder 1, thereby forming a film. It is also possible to make such arrangements that, after the film constituting material has been palletized, the aforementioned pellets are melted by the extruder 1, thereby forming a film. Further, when the film constituting material contains a plurality of materials having different melting points, melting is performed at the temperature where only the material of lower melting point can be melted, thereby producing a patchy half-melt. This half-melt is put into the extruder 1, whereby a film is formed. When the film constituting material contains the material that is easily subjected to thermal decomposition, it is preferred to use the method of creating a film directly without producing pellets for the purpose of reducing the frequency of melting, or the method of producing a patchy half-melt followed by the step of forming a film, as described above.

Various types of extruders sold on the market can be used as the extruder 1, and a melting and kneading extruder is preferably used. Either the single-screw extruder or twin screw extruder may be utilized. If a film is produced directly from the film constituting material without manufacturing the pellet, an adequate degree of kneading is required. Accordingly, use of the twin screw extruder is preferred. However, the single-screw extruder can be used when the form of the screw is modified into that of the kneading type screw such as a Maddox type, Unimelt type and Dulmage type, because this modification provides adequate kneading. When the pellet and patchy half-melt is used as a film constituting material, either the single-screw extruder and twin screw extruder can be used.

In the process of cooling inside the extruder 1 or subsequent to extrusion, the density of oxygen is preferably reduced by replacement with such an inert gas as nitrogen gas or by pressure reduction.

The desirable conditions for the melting temperature of the film constituting material inside the extruder 1 differ depending on the viscosity of the film constituting material, discharge rate or the thickness of the sheet to be produced. Generally, the melting temperature is Tg or more without exceeding Tg+100° C. with respect to the glass transition temperature Tg of the film, preferably Tg+10° C. or more without exceeding Tg+90° C. The melting viscosity at the time of extrusion is 10 through 100000 poises, preferably 100 through 10000 poises. Further, the film constituting material retention time in the extruder 1 is preferably shorter. This time is within 5 minutes, preferably within 3 minutes, more preferably within 2 minutes. The retention time depends on the type of the extruder 1 and conditions for extrusion, but can be reduced by adjusting the amount of the material supplied, and L/D, screw speed, and depth of the screw groove.

The shape and speed of the screw of the extruder 1 are adequately selected according to the viscosity of the film constituting material and discharge rate. In the embodiment of the present invention, the shear rate of the extruder 1 is 1/sec. through 10000/sec., preferably 5/sec. through 1000/sec., more preferably 10/sec. through 100/sec. As an extruder 1 which can be used for the present invention, it can be obtained generally as a plastic molding machine.

The film constituting material extruded from the extruder 1 is sent to the casting die 4 and is extruded from the slit of the casting die 4 in the form of a film.

The molten material extruded from the extruder 1 is fed to the casting die 4. There is no restriction to the casting die 4 if it can be used to manufacture a sheet and film. The material of the casting die 4 is exemplified by hard chromium, chromium carbide, chromium nitride, titanium carbide, titanium carbon nitride, titanium nitride, cemented carbide and ceramics (e.g., tungsten carbide, aluminum oxide, chromium oxide), which are sprayed or plated, and are subjected to surface treatment by buffing, lapping with a grinding wheel having No. 1000 and after, plane cutting with a diamond wheel having No. 1000 (cutting in the direction perpendicular to the resin flow), electrolytic polishing, and composite electrolytic polishing.

The preferred material of the lip of the casting die 4 is the same as that of the casting die 4. The surface accuracy of the lip is preferably 0.5 S or less, more preferably 0.2 S or less.

In this invention, the resin mixture that has been melted is extruded as a film-like resin from the casting die 4 that is mounted on the extruder, and the extruded film-like resin is adhered to at least two rotating bodies and then taken out.

Figure 4A:
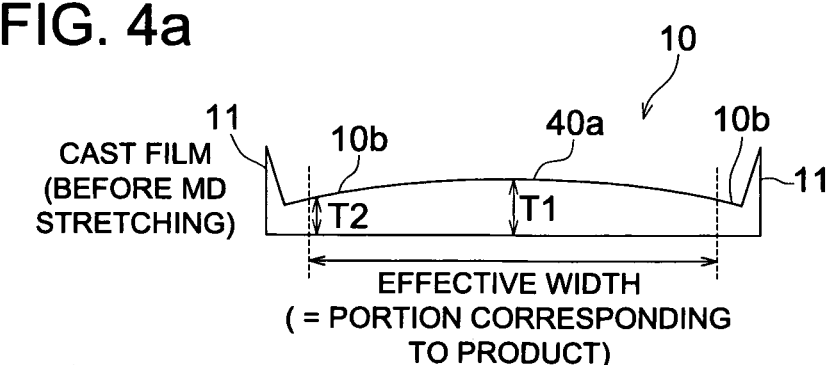
FIG. 4a shows the state before a MD stretching.

In the optical film production method according to the present invention, in the extruding process of extruding a melted material containing a thermoplastic resin as a main component, for example, as shown in FIG. 4a, the following formula is established between a film thickness T1 (μm) on a central portion 10a in a widthwise direction of the extruded web (film) 10 and a film thickness T2 (μm) on both side portions 10b, 10b in the widthwise direction of the extruded web (film) 10.

$$10\ \mu m \leq T1 - T2 \leq 200\ \mu m$$

On both end portions of the web 10 at the time of the casting, warps 11, 11 are formed. However, when a film F is cut into a predetermined effective width (a portion corresponding to a product) by slitters 13, 13 mentioned later, the warps 11, 11 both end portions of the web 10 are removed.

Here, a thickened amount of the central portion of a film in the widthwise direction can be adjusted appropriately by a roller width, a degree of elasticity of a roller, a film width, a film viscosity, and the like. When the thickened amount of the central portion of a film in the widthwise direction is less than 10 μm, it is too small as compared with an amount of deflection to obtain a sufficient effect. On the hand, when the thickened amount exceeds 200 μm, since there is a risk that an abrasion is caused on a film due to a difference in roller peripheral speed, it is nor preferable.

As shown in FIG. 1 and FIG. 2, in the optical film production method of the present invention, a temperature lowering from the time that a film firstly comes in contact with the surface of the first cooling roller 5 until the film comes in contact with the surface of the touch roller 6 is desirably 20° C. or less. If temperature lowering from the time that a film firstly comes in contact with the surface of the first cooling roller 5 until the film comes in contact with the surface of the touch roller 6 is too large, unevenness in film thickness becomes larger due to uneven contraction. Further, if the temperature at the time that the film comes in contact with the surface of the touch roller 6 is too low, correction for flatness of a film and unevenness in film thickness becomes insufficient due to high viscosity of the film even if the film is pinched with pressure.

Examples of preferable materials for forming the first cooling roller 5 and the touch roller 6 include carbon steel, stainless steel, resin and the like. In addition, increasing surface roughness is preferable and the surface roughness is preferably 0.3 S or less, and more, preferably 0.1 S or less.

The touch roller 6 is preferably to press a film onto the first cooling roller 5 by a pressing means. At this time, the linear pressure with which the touch roller 6 presses the film can be adjusted by an oil pressure piston or the like and is preferably 0.1 to 100 N/mm and more preferably 1 to 50 N/mm.

In order to enhance uniformity in contact with film, the first cooling roller 5 or the touch roller 6 may be shaped to reduce the diameter at both ends of the roller or to have a flexible roller surface.

It has been found out that, if the pressure is reduced to 70 kPa or less in the portion from the opening (lip) of the casting die 4 to the first roll 5, the aforementioned die line can be effectively corrected. In this case, this pressure is preferably reduced to 50 kPa or more without exceeding 70 kPa. There is no restriction to the method for ensuring that the pressure in the portion from the opening (lip) of the casting die 4 to the first roll 5 is kept at 70 kPa or less. For example, it is possible to reduce the pressure if the portion around the roll from the casting die 4 is covered with a pressure resistant member. In this case, a suction apparatus is preferably heated by a heater so that a sublimate is not deposited on the apparatus per se. In the embodiment of the present invention, if the suction pressure is too small, a sublime cannot be effectively sucked. This requires an appropriate suction pressure to be selected.

In this embodiment, while the molten film-like cellulose ester-based resin coming from the casting die 4 is conveyed by sequential contact with the first roll (the first cooling roll) 5, second cooling roll 7 and third cooling roll 8, the resin is cooled and solidified, whereby a cellulose ester based resin film 10 is obtained.

In the embodiment of the present invention shown in FIG. 1, the film 10 pinched with pressure which is peeled off, cooled and solidified by the third cooling roller (the fourth rotating member for cooling) 8 through the separating roller 9 is introduced into an MD stretching zone (20) and is subjected to a roller stretching in a conveying direction (MD direction).

Figure 3:
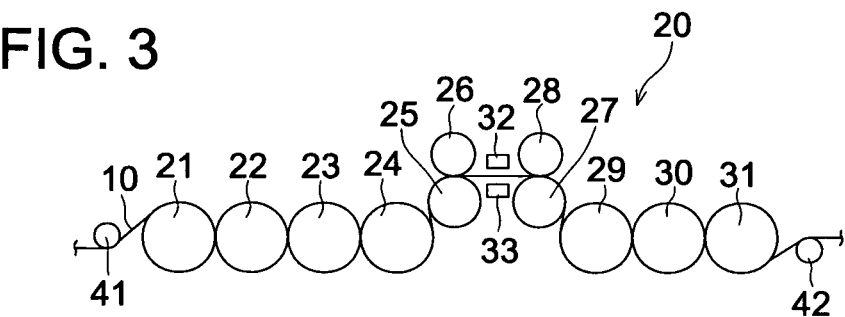
FIG. 3 is a flow sheet showing the details of a MD stretching zone of FIG. 1.

FIG. 3 shows the MD stretching zone 20 in detail. In FIG. 3, the pinched unstretched film 10 introduced into the MD stretching zones 20 by the guide roller 41 passes through a first before-stretching preheating roller 21, second before-stretching preheating roller 22, a third before-stretching preheating roller 23, and a fourth before-stretching preheating roller 24, reaches a stretching and preheating roller 25, and is wound around a stretching and the cooling roller 27 by being conveyed while being pressed from an upper portion with a nipping roller 26.

Between the stretching and preheating roller 25, and the stretching and cooling roller 27, an upper heating heater 32 and a lower heating heater 33 are arranged. The film 10 wound around the stretching and cooling roller 27 is conveyed while being pressed from an upper portion by a nipping roller 28 there, and is subjected to an MD stretching here. Further, the film 10 passes through a first after-stretching cooling roller 29, a second first after-stretching cooling roller 30, and a third first after-stretching cooling roller 31 and is conveyed toward the outside of the MD stretching zones 20 by a guide roller 42.

In the MD stretching process in this MD stretching zone 20, a unstretched film 10 after being pinched with pressure is stretched in the lengthwise direction by 1.1 times or more and 3.0 times or less.

For example, when a wider width optical film having a width of 1500 mm or more and 4000 mm or less, preferably 1500 mm or more and 2500 mm or less is produced with a touch roller method, a difference in pressure received by a film is caused between a central portion and end portions of the film by deflection of a roller. As a result, a surface correction is not made in good order due to the difference.

The influence of this deflection can be cancelled (eliminated) by making the central portion of a film thicker by 10 to 200 μm as compared with end portions.

Figure 4B:
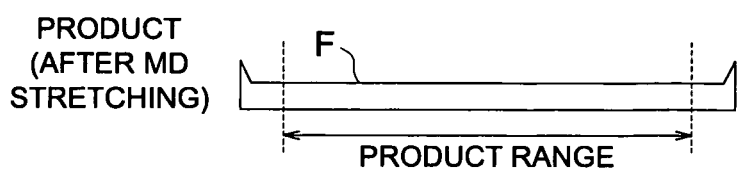
FIG. 4b shows the state after the MD stretching.

However, usually, a film thickness deviation in the width direction of an optical film is requested to be suppressed 5 μm or less, preferably about 2 μm. As a result of a study how to fill this gap, it has been found that when a film is stretched (MD stretching) in the lengthwise direction (conveying direction) by 1.1 times to 3.0 times in accordance with an amount of a film thickness of a central portion of a film in the widthwise direction, a final film thickness configuration in the widthwise direction can be made flat, for example as shown in FIG. 4b.

Figure 5:
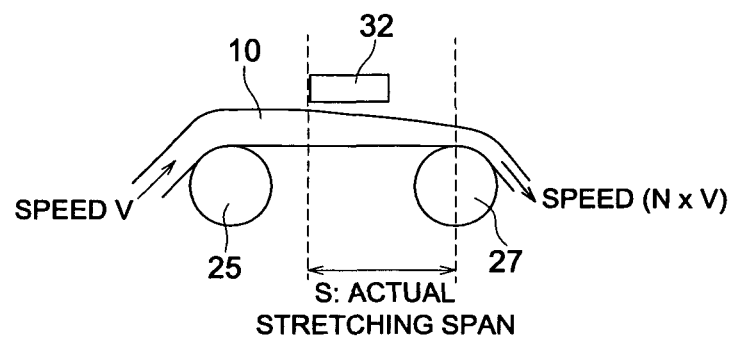
FIG. 5 is a partially-enlarged outline side view for explaining a MD stretched state of a web (film) in, an MD stretching zone.

In the optical film production method of the present invention, the stretching method in the MD stretching process is a roller stretching method conducted between two conveying rollers arranged in close proximity to each other, and an actual stretching span is made 50 mm or more and 300 mm or less by subjecting the pinched unstretched film to the MD stretching on the state that the film is heated and softened by heating with heaters 32, 33 as shown in FIG. 5.

In this way, as the condition of the MD stretching, it is required to make an actual stretching span to be 50 mm to 300 mm, and in order to clear this actual stretching span, the roller stretching method of carrying out an MD stretching between two rollers 25, 27 arranged in close proximity is advantageous as compared with an oven heating method.

When the actual stretching span is less than 50 mm, a setting space of a heating device, such as a heater, is restricted and a small roller diameter is required, so that a large stretching stress cannot be obtained and it becomes an obstacle in increasing a production rate. Therefore, it is not desirable.

On the other hand, when the actual stretching span exceeds 300 mm, a widthwise shrinkage amount accompanying with the MD stretching becomes large. Therefore, since it becomes an obstacle in widening a width, it is not desirable.

Here, a roller stretching in the MD stretching zone 20 will be explained in detail.

First, the roller stretching is a method of carrying out a MD stretching of a film 10 by a peripheral speed difference between a low speed roller group (21 to 25) and a high speed roller group (27 to 31). The film 10 is preheated by the low speed roller group (21 to 25), is subjected to an MD stretching while being heated to a stretching temperature with heaters 32 and 33 provided between the low speed roller group (21 to 25) and the high speed roller group (27 to 31), it can warm rapidly, is cooled by the high speed roller group (27 to 31), and is conveyed to a next process.

The fewer number of preheating rollers of the low speed roller group (21 to 25) is desirable from a viewpoint of abrasion. However, the number of the preheating rollers may be selected in accordance with the preheating temperature of the film 10, and the number of rollers may be one or more and 20 or less, preferably 2 or more and 15 or less.

The upper limit temperature of the preheating roller group is a glass transition temperature (Tg) of a film 10 or less, preferably (Tg−5) ° C. or less in consideration of not carrying out an MD stretching among preheating rollers in principle and preventing an adherence accident.

In consideration of preventing wrinkles from taking place on a film due to thermal expansion, a heating rate by the preheating roller group is preferably adjusted such that a film temperature difference between an entrance side and an exit side of each roller is 80° C. or less, preferably 50° C. or less.

The number of cooling rollers of the high speed roller group (27 to 31) may be selected in accordance with a cooling temperature, and one or more and 15 or less, preferably 2 or more and 10 or less of roller are used.

In consideration of not cooling too fast, an upper limit temperature of a cooling roller group is made below the glass transition temperature (Tg) ° C. of a film, preferably below (Tg−5) ° C.

In consideration of preventing wrinkles from taking place on a film due to thermal contraction, a temperature decreasing rate by a cooling roller group is preferably adjusted such that a film temperature difference between an entrance side and an exit side of each roller is 100° C. or less.

From the viewpoint of a roller strength and a contact area (heat transfer, slippage), the diameter of a roller of the preheating roller group and the cooling roller group is made 100 mm φ or more and 400 mm φ or less, preferably 150 mm φ or more and 300 mm φ or less. Especially, In order to shorten the actual stretching span S, it is desirable that the stretching rollers 25 and 27 have a diameter of 250 mm φ or less.

Incidentally, in order to prevent a film from slipping, being damaged and being stretched between rollers, a draw is applied in accordance with thermal expansion or thermal contraction. The draw of a roller is 5% or less between adjacent rollers, preferably 1% or less.

Here, the draw of a roller is a ratio of a peripheral speed V1 of a roller at the low speed side and a peripheral speed V2 of a roller at the high speed side, and is represented by (V2−V1)/V1.

With regard to driving of rollers in the preheating roller group and the cooling roller group, in order to control the above-mentioned draw of a roller, it is desirable that each roller is a drive roller, however, an auxiliary drive roller and a free roller may be used partially.

As a speed reducing mechanism, a planetary roller, a roller gear, and the like may be suitably employed. Further, a direct drive type may be also employed, and these driving mechanisms may be appropriately selected in accordance with a system.

With regard to the surface roughness of a roller in the preheating roller group and the cooling roller group, the material and roughness of a roller may be changed in accordance with objects. For example, for a roller to come in contact with a film at a high temperature or for preventing slippage, it is desirable to use a mirror surface roller having a surface roughness of 0.5 S or less, preferably 0.2 S or less, and for cutting a tension or for preventing sticking, it is desirable to use a rough surface roller having a surface roughness of 1.0 S or more.

As the material of the surface of a roller in the preheating roller group and the cooling roller group, for example, ceramics which is subjected to a surface treatment with a hard chromium (H-Cr), aluminium oxide, titanium oxide, chrome oxide, etc. and these composites; silicon; fluorine; rubbers such as a chloroprene rubber, and resins, such as Teflon (registered trademark), may be employed.

With regard to arrangement and spacing of rollers in the preheating roller group and the cooling roller group, in order to prevent a MD stretching between rollers and to prevent a film from being cooled, a narrower gap is better. A distance from a point at which a film separates from a roller and to a point at which the film reaches the next roller for each of adjacent rollers is 200 mm or less, preferably 100 mm or less.

Further, the diameter of the nipping rollers 26 and 28 is not restricted specifically. However, in order to secure a space for installing the heaters 32, 33, it is desirable that the diameter of the nipping rollers 26 and 28 is smaller than that of the stretching roller group.

As the material of the nipping rollers 26 and 28, rubber rollers, such as a silicon rubber, fluororubber, and chloroprene rubber, and resin rollers, such as fluororesin, which tend to cause elastic deformation easily, may be employed suitably.

With regard to the location of the nipping rollers 26 and 28, it is desirable to arrange them to press down a film at a location where the film separates from or arrives at. Further, from the viewpoints that the nipping rollers 26 and 28 can nip a film with a pressure and do not damage the film, the pressure of the nipping rollers 26 and 28 is 0.1 to 50 N/mm, preferably 0.5 to 20 N/mm.

Further, the nipping rollers 26 and 28 may nip only end portions of a film in order to prevent flaws of a film. From a viewpoint of suppressing widthwise shrinkage, the nipping rollers 26 and 28 may be shaped in a drum type, or may be arranged with a certain angle to the film widthwise direction.

Next, as a type of heaters 32 and 33, from viewpoints of cleanness, high efficient, and space saving and the like, for example, radiation type heat sources, such as an infrared heater, a halogen lamp heater, and a ceramic heater, are desirable, and the type may be selected in accordance with the absorption ability of resin.

The number of heaters 32 and 33 may be calculated based on a heater capacity, an MD stretching and preheat temperature, a conveying speed, film thickness, a heat conductivity, and the like, and usually 1 to 8 of heaters, preferably 1 to 12 of heaters are used.

In order to increase efficiency, the height of heaters 32 and 33 is arranged close to a film as far as possible within a range that they do not come in contact with the film. For example, the height is 5 to 100 mm, preferably 10 to 50 mm.

The output of the heaters 32 and 33 may be adjusted to a proper output value in consideration of a stretching temperature, a heating rate, and the like.

The stretching temperature is (a glass transition temperature Tg of a film−20) ° C. or more and a melting point Tm ° C. or less, preferably Tg ° C. or more and (Tg+100) ° C. or less, more preferably (Tg+10) ° C. or more and (Tg+80) ° C. or less.

The MD stretching speed is 3000%/min or more and 75000%/min or less, and preferably 5000%/min or more and 50000%/min or less.

Here, the MD stretching speed (%/min) is defined as follows. That is, when a peripheral speed of a low speed side stretching roller is V1, a peripheral speed of a high speed side stretching roller is V2, and an actual stretching span is S, the MD stretching speed is expressed with the following formula.

$$MD \text{ stretching speed}(\%/min) = [(V2-V1)/S] \times 100$$

With regard to the spacing among the MD stretching rollers, if a section on which a film is not held by rollers is shorter, a widthwise shrinkage is suppressed to be smaller. Here, the distance between the centers of adjacent rollers is 400 mm or less, preferably 300 mm or less.

With regard to a cleaning apparatus for preheating, stretching, and cooling rollers in the MD stretching zone 20, one cleaner or plural cleaners may be provided in in-line or off-line, and it may be not necessary to install the cleaning apparatus depending on the case. As a cleaning means, a well-known roller cleaning means, such as a method of wiping off soils by pressing a nonwoven fabric on a roller and the like may be employed suitably.

In the optical film production method according to the present invention, in the MD stretching process, a unstretched film 10 after being pinched with pressure is stretched in the film conveying direction (MD direction) by 1.1 times or more and 3.0 times or less, and in the extruding process, the following formula is established between a film thickness T1 (μm) on a central portion in a widthwise direction of the extruded web and a film thickness T2 (μm) on both side portions in the widthwise direction of the extruded web.

$$10 \text{ μm} \leq T1 - T2 \leq 200 \text{ μm}$$

According to the invention, since controlling of a film thickness of web in casting and MD stretching by a so-called heater heating method are combined, a final film thickness configuration can be made flat, for example, as shown in FIG. 4b even for a film having been cast in a center portion thicker film, for example, as shown in FIG. 4a, whereby an optical having a good flatness and excellent optical characteristics can be produced.

In this way, in the present invention, the stretching method of a film in the MD stretching process is a roller stretching type in which a stretching is conducted between two conveying rollers 25, 27 arranged in close proximity to each other and the film is heated by heaters 32, 33 to be softened and subjected to the MD stretching with an actual stretching span of 50 mm or more and 300 mm or less. Therefore, a final film thickness configuration can be made flat, for example, as shown in FIG. 4b even for a film having been cast in a center portion thicker film, for example, as shown in FIG. 4a, whereby an optical having a good flatness and excellent optical characteristics can be produced.

Subsequently, the film after the MD stretching is led to a widthwise stretching apparatus (tentar) 12, and the film 10 is stretched in the transverse direction (width direction) there. With this widthwise stretching, molecules in the film are orientated.

In the embodiment of the present invention shown in FIG. 1, the film 10 is peeled off from the third cooling roller 8 by the separating roller 9, cooled and solidified, and successively the resultant unstretched film 10 pinched with a pressure is introduced into the MD stretching zone (20), and stretched in the conveying direction (MD direction) by a roller stretching.

Namely, FIG. 1 shows the case that the film is subjected to the MD stretching on an on-line (or in-line) basis. However, the present invention is not limited to this embodiment. In addition, there may be a case that the cooled, solidified unstretched film 10 pinched with a pressure is once rolled up into a roll form, thereafter, the unstretched film 10 is rolled out from the roll form on off-line basis, introduced into the MD stretching zone (20), and stretched in the conveying direction (MD direction) by a roller stretching.

In the case of a transverse stretching (width stretching), if the stretching region is divided into two or more regions and the widthwise stretching is conducted sequentially in the two or more regions through which the stretching temperature is gradually increased with a temperature difference of 1 to 50° C., it is desirable, because distribution in terms of thickness and optical characteristics in width direction can be reduced.

The film can be stretched across the width preferably by a known tenter. As described above, the film is stretched across the width. This arrangement preferably allows the lamination layer with the polarizing film to be implemented in the form of a roll. Stretching across the width ensures that the low axis of the optical film made up of the cellulose ester based resin film is oriented across the width.

On the other hand, the transmission axis of the polarizing film is also oriented across the width. The polarizing plate is incorporated into the liquid crystal display apparatus, wherein this polarizing plate is laminated in such a way that the transmission axis of the polarizing film and the low axis of the optical film will be parallel to each other. This arrangement improves the display contrast of the liquid crystal display apparatus, and provides an excellent angle of field.

In the manufacturing method of this invention, when the optical film is manufactured, an optical film having a surface roughness Ra of 0.1 µm or less, or 0.05 µm or less is obtained. The variation in the film thickness in the width direction (entire width of the film) is not more than ±3%, and more preferably not more than ±2% with respect to the average film thickness. "Average film thickness" refers to the average value of the thickness of the entire film excluding the both ends (margins) from the necking. The surface roughness of the film and the variation in film thickness may be measured by known methods. For example, for the film surface roughness, there is a method in which the film surface is measured at about 5 mm using a surface roughness meter and compared with the average roughness (Ra). In addition, the film thickness variation may be measured with a film thickness meter, and the standard deviation is determined and width variation with respect to the average film thickness can be compared.

The glass transition temperature Tg may differ depending on the film constituting material. However, the glass transition temperature Tg of the film constituting material can be controlled when the types of the materials constituting the film and the proportion of the constituting materials are made different. When the retardation film is manufactured as an optical film, Tg is 120° C. or more, preferably 135° C. or more. In the liquid crystal display apparatus, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed inside the film by stretching. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under known thermal setting conditions can be applied in the stretching process. Appropriate adjustment should be made to obtain the characteristics required of the intended optical film.

In the case that a retardation film is produced, the aforementioned stretching process and thermal setting process are applied as appropriate to provide the retardation film function for the purpose of improving the physical property of the retardation film and to increase the angle of field in the liquid crystal display apparatus. That is, when a retardation film is produced as an optical film and the functions of the polarizing plate protective film are combined, control of the refractive index is essential. The refractive index control can be provided by the process of stretching. The process of stretching is, preferred. The following describes the method for stretching.

In the retardation film stretching process, required retardations Ro and Rth can be controlled by a stretching magnification of 1.0 through 2.0 in one direction of the cellulose resin, and a stretching magnification of 1.01 through 2.5 times in the direction perpendicular to the inner surface of the film. Here Ro denotes an in-plane retardation. It represents the thickness multiplied by the difference between the refractive index in the longitudinal direction MD in the same plane and that across the width TD. Rth denotes the retardation along the thickness, and represents the thickness multiplied by the difference between the refractive index (an average of the values in the longitudinal direction MD and across the width TD) in the same plane and that along the thickness.

Stretching can be performed sequentially or simultaneously, for example, in the longitudinal direction of the film and in the direction perpendicular in the same plane of the film, namely, across the width. In this case, if the stretching magnification at least in one direction is insufficient, sufficient retardation cannot be obtained. If it is excessive, stretching difficulties may occur and the film may break.

Stretching in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

In the case of stretching in the widthwise direction, distribution may occur to the refractive index across the widthwise direction. This distribution may appear when a tenter method is utilized. Stretching of the film across the width causes shrinkage force to appear at the center of the film because the ends are fixed in position. This is considered to be what is called "bowing". In this case, bowing can be controlled by stretching in the casting direction, and the distribution of the retardation across the width can be reduced.

Stretching in the biaxial directions perpendicular to each other reduces the fluctuation in the thickness of the obtained film. Excessive fluctuation in the thickness of, the retardation film will cause irregularity in retardation. When used for liquid crystal display, irregularity in coloring or the like will occur.

The fluctuation in the thickness of the cellulose resin film is kept within the range of ±3%, preferably ±1%. To achieve the aforementioned object, it is effective to use the method of stretching in the biaxial directions perpendicular to each other. In the final phase, the magnification rate of stretching in the biaxial directions perpendicular to each other is preferably 1.0 through 2.0 in the casting direction, and 1.01 through 2.5 across the width. Stretching in the range of 1.01 through 1.5 in the casting direction and in the range of 1.05 through 2.0 across the width will be more preferred to get a retardation value.

When the absorption axis of the polarizer is present in the longitudinal direction, matching of the transmission axis of the polarizer is found across the width. To get a longer polarizing plate, the retardation film is preferably stretched so as to get a low axis across the width.

When using the cellulose resin to get positive double refraction with respect to stress, stretching across the width will provide the low axis of the retardation film across the width because of the aforementioned arrangement. In this case, to improve display quality, the low axis of the retardation film is preferably located across the width. To get the target retardation value, it is necessary to meet the condition of the following formula:

(Stretching magnification across the width)>(stretching magnification in casting direction)

After stretching, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the optical film F (master winding) or scratch.

The knurling method can be provided on the lateral surface by heating and pressing a metallic ring having a pattern of projections and depressions. The gripping portions of the clips on both ends of the film are normally deformed and cannot be used as a film product. They are therefore cut out and are recycled as a material.

When the retardation film is used as a protective film of the polarizing plate, the thickness of the aforementioned protective film is preferably 10 through 500 μm. Especially the lower limit is 20 μm or more, preferably 35 μm or more. The upper limit is 150 μm or less, preferably 120 μm or less. A particular preferred range is 25 through 90 μm. If the retardation film is too thick, the polarizing plate subsequent to machining will be too thick. This fails to meet low-profile light weight requirements when employed in the liquid crystal display for a notebook PC or mobile type electronic equipment. Conversely, if the retardation film is too thin, retardation as a retardation film cannot occur easily. Further, the film moisture permeability will be increased, with the result that the polarizer cannot be effectively protected from moisture. This must be avoided.

The target optical film of the present invention is an functional film used for various displays, such as a liquid crystal display, a plasma display, an organic EL display and the like, especially for a liquid crystal display and examples of the functional film include a polarizing plate protective film, a retardation film, an antireflection film, a luminous enhancing film, an optical compensation film, such as view angle enlarging and the like, especially a retardation film.

<Liquid Crystal Display Apparatus>

The polarizing plate including the retardation film in the embodiment of the present invention provides higher display quality than the normal polarizing plate. This is particularly suited for use in a multi-domain type liquid crystal display apparatus, more preferably to the multi-domain type liquid crystal display apparatus in the double refraction mode.

To make in multi-domain type is suitable also for improvement in the symmetry of image presentation and various methods are reported, "Okita, Yamauchi: Liquid crystal, 6 (3), 303 (2002)". Since this liquid crystal display cell is also indicated in "Yamada, Yamahara: Liquid crystal, 7(2), 184 (2003)", it is not limited to these.

The polarizing plate employing an optical film of the present invention can be used effectively in a MVA (Multi-domain Vertical Alignment) mode represented with a vertical alignment mode, especially a four division type MVA mode, a well-known PVA (Patterned Vertical Alignment) mode which is made into multi-domain by an electrode arrangement, and a CPA (Continuous Pinwheel Alignment) mode in which the Chiral function and an electrode arrangement are united. Further, for the adaptation for an OCB (Optical Compensated Bend) mode, a proposal with regard to a film having a biaxial property optically is disclosed "T. Miyashita, T. Uchida: J. SID, 3(1), 29 (1995)". Therefore, it is possible to exhibit a display quality effect by a polarizing plate employing an optical film of the present invention.

If a display quality effect can be exhibited with a polarizing plate employing an optical film of the present invention, the arrangement of the polarizing plate is not limited.

It is desirable that the display quality of a display cell is symmetrical in observation of people. Therefore, when the display cell is a liquid crystal display cell, a domain can be made into multi with priority substantially given to the symmetry at the side of observation. A domain can be divided by adopting a well-known method and the method can be determined in consideration of the nature of a well-known liquid crystal mode by two-dividing method, more preferably four-dividing method.

The liquid crystal display apparatus is coming into practical use as a colored and animation display apparatus. The display quality is improved by the embodiment of the present invention. The improved contrast and enhanced polarizing plate durability ensure faithful animation image display without easy fatigue.

In the liquid crystal display apparatus containing at least the polarizing plate incorporating a retardation film in the embodiment of the present invention, one polarizing plate containing the retardation film in the embodiment of the present invention is arranged on the liquid crystal cell, or two polarizing plates are arranged on both sides of the liquid crystal cell. In this case, the display quality is improved when means are provided to ensure that the side of the retardation film in the embodiment of the present invention contained in the polarizing plate faces the liquid crystal cell of the liquid crystal display apparatus.

In the polarizing plate, a polarizing plate protective film of cellulose derivative is used on the surface opposite the retardation film as viewed from the polarizer. A general-purpose TAC film or the like can be employed. The polarizing plate protective film located far from the liquid crystal cell can be provided with another functional layer for the purpose of improving the quality of the display apparatus.

To an optical film of the present invention, for example, functions of antireflection, antiglare, scratch resistant and dust adhesion protection, brightness enhancement and the like may be added. These functional layers may be pasted onto the surface of a polarizing plate. However, it is not limited to these.

Generally, to ensure stable optical characteristics, the retardation film is required to exhibit small fluctuations in the Ro or Rth as the aforementioned retardation value. Especially, these fluctuations may cause irregularities of an image in the liquid crystal display apparatus in the double refraction mode.

In films manufactured using the liquid casting method, the retardation value may change depending on evaporation of an extremely small amount of organic solvent remaining in the film. In the long retardation film is manufactured, stored and transported in a long roll state, and is processed into a polarizing plate by a worker in the polarizing plate manufacturing industry or the like. Thus residual solvent is present and evaporation is reduced as the inside of the roll is approached. As a result, difference in concentration of the small amount of the residual solvent is generated from the outside to the inside of the roll and from both ends to the center of the roll, in the width direction, and these trigger changes with time and variation in the retardation value.

Meanwhile, in this invention, because film is manufactured by melt casting, unlike in liquid casting, there is no solvent to cause evaporation. Therefore, a roll-shaped film is obtained in which there is little change with time and variation in the retardation value.

The film that is manufactured by melt casting according to this invention is excellent in that, because cellulose resin is the main component, characteristic saponification of the cellulose resin and an alkali processing step can be utilized. In the case where the resin for forming the polarizer is polyvinyl alcohol, as is the case for the polarizing plate protective, film of the prior art, the retardation film of this invention can be adhered using completely saponification polyvinyl alcohol solvent. Thus this invention is excellent in that the polarizing plate processing method of the prior art can be used and the long polarizing plate in particular can be used.

Further, especially in the case that a film is produced by the use of a wide width casting die 4 having a casting die exit corresponding to a film (web) width of 1500 mm or more and 4000 mm or less, an effect capable of producing a film having a high flatness can be obtained according to the present invention.

In the case where the width of a film (web) at the casting die exit is 1500 mm or more, it is possible to obtain a product that is an optical film with a length that exceeds 2000 mm after stretching is performed. In this invention in order to achieve the effect of obtaining a highly smooth film in particular, the width in the longitudinal direction of the casting die exit should be 1500 mm to 4000 mm and more particularly 1700 mm to 4000 mm. The film having a casting width that exceeds 4000 mm is not suitable for practical use as it is expected that stability will be low in the subsequent conveyance step.

In the case where the thickness of the film that is nipped between the first rotating member and the second rotating member is 15 μm to 80 μm, a film with particularly high level of smoothness can be obtained. In the case where the thickness of the film that is nipped between the first rotating member and the second rotating member is 15 μm to 80 μm, after stretching is performed, a product which is a 10 μm to 70 μm optical film can be obtained. In the case where the thickness of the film that is nipped between the first rotating member and the second rotating member is thinner than 15 μm, there is a high risk that ends of the first rotating member and the second rotating member will contact each other, and thus this is not favorable.

When manufacturing the retardation film, a functional layer such as an antistatic layer, a hard coated layer, an easily-sliding ability, an adhesive layer, an antiglare layer and a barrier layer may be coated before and/or after stretching. In this case, various forms of surface treatment such as corona discharging, plasma processing, medical fluid treatment can be provided wherever required.

In the film making process, the gripping portions of the clips on both ends of the film haying been cut can be recycled as the material of the same type or different type of films, after having been pulverized, or after having been pelletized as required.

An optical film of lamination structure can be produced by co-extrusion of the compositions containing cellulose resins having different concentrations of additives such as the aforementioned plasticizer, ultraviolet absorber and matting agent. For example, an optical film made up of a skin layer, core layer and skin layer can be produced. For example, a large quantity of matting agent can be put into the skin layer or the matting agent can be put only into the skin layer. Larger amounts of plasticizer and ultraviolet absorber can be put into the core layer than the skin layer. They can be put only in the core layer. Further, the types of the plasticizer and ultraviolet absorber can be changed in the core layer and skin layer. For example, it is also possible to make such arrangements that the skin layer contains a plasticizer and/or ultraviolet absorber of lower volatility, and that the core layer contains a plasticizer of excellent plasticity or an ultraviolet absorber of excellent ultraviolet absorbing performance. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting may be different between the skin layer and core layer. The viscosity of the skin layer may be greater than that of the core layer. Alternatively, the viscosity of the core layer may be equal to or greater than that of the skin layer.

Assuming that the dimension of film when the film is left to sand for 24 hours at a temperature of 23° C. with a relative humidity of 55% RH is made as the standard, the dimensional stability of the optical film of the present embodiment is such that the fluctuation of the dimension at 80° C. and 90% RH is less than ±2.0%, preferably less than ±1.0% or less, more preferably less than ±0.5%.

When the optical film of the present embodiment is used as a protective film of the polarizing plate as the retardation film, if the retardation film has a fluctuation in excess of the aforementioned range, the absolute value of the retardation as a polarizing plate and the orientation angle will deviate from the initial setting. This may cause reduction in the capacity of improving the display quality, or may result in deterioration of the display quality.

The retardation film of the present invention can be used for the polarizing plate protective film. When used as a polarizing plate protective film, there is no restriction to the method of producing the polarizing plate. The polarizing plate can be manufactured by a commonly used method. The retardation film having been obtained is subjected to alkaline treatment. Using an aqueous solution of completely saponified polyvinyl alcohol, the polarizing plate protective film is bonded on both surfaces of the polarizer manufactured by immersion the polyvinyl alcohol film in an iodonium solution and by stretching the same. When this method is used, the retardation film as the polarizing plate protective film in the embodiment of the present invention is directly bonded to at least one of the surfaces of the polarizer.

Instead of the aforementioned alkaline treatment, the film can be provided with simplified adhesion as disclosed in the Japanese Non-Examined Patent Application Publication (Tokkaihei) 6-94915 and Japanese Non-Examined Patent Application Publication (Tokkaihei) 6-118232.

The polarizing plate is made up of a polarizer and a protective film for covering both surfaces thereof. Further, a protective film can be bonded onto one of the surfaces of the aforementioned polarizing plate and a separate film can be bonded on the opposite surface. The protective film and separate film are used to protect the polarizing plate at the time of product inspection before shipment of the polarizing plate. In this case, the protective film is bonded to protect the surface of the polarizing plate, and is used on the surface opposite to the surface wherein the polarizing plate is bonded to the liquid crystal substrate. Further, the separate film is used to cover the adhesive layer to be bonded to the liquid crystal substrate, and is used on the surface wherein the polarizing plate is bonded to the liquid crystal cell.

EXAMPLE

Examples 1 through 6

| (Resin mixture) | |
|---|---|
| Cellulose acetate propionate (the degree of acetyl group substitution: 1.4, the degree of propionyl group substitution: 1.35, number average molecular weight: 60000) | 89 weight % |
| Trimethylolpropane tribenzoate (Plasticizer, a melting point of 85° C.) | 9 weight % |
| Antioxidant (IRGANOX XP 420/FD) (manufactured by Ciba Speciality Chemicals Corp.) | 0.25 weight % |
| Ultraviolet absorber (TINUVIN 928, manufactured by Ciba Speciality Chemicals Corp., a melting point of 115° C.) | 1.6 weight % |
| Matting agent (silica particle) (SEAHOSTAR KEP-30: manufactured by NIPPON SHOKUBAI Co., Ltd., average particle diameter of 0.3 μm) | 0.15 weight % |

Here, the measurement of a degree of substitution of acyl groups of cellulose acetate propionate, such as an acetyl group, a propionyl group, and a butyryl group, was conducted in accordance with the method specified in ASTM-D 817-96.

After above-mentioned materials were mixed by a V shaped mixer for 30 minutes, the resultant mixture was melted at 230° C. under an atmosphere of, nitrogen by the use of a double screw extruder equipped with a strand die, whereby cylindrical pellets with a length of 4 mm and a diameter of 3 mm was produced. The obtained pellets had a glass transformation point (Tg) of 135° C.

The above pellets were dried at 100° C. for 5 hours, so that the water content of the pellets was made to 100 ppm, and then these pellets were supplied to a single screw extruder 1 equipped with a T die 4 shown in FIG. 1 in such a way that a film production was conducted. The molten material was made to contain 11 weight % of an additive agent other than resin.

In the single screw extruder 1 (a screw diameter of 90 mm, L/D=30), the number of rotations of the screw was adjusted in such a way so that an extrusion amount became 140 kg/h. From the vicinity of a material feed hopper, nitrogen gas was introduced, whereby the inside of the extruder 1 was maintained with a nitrogen atmosphere. The temperature of the extruder 1 and the T die 4 was set to 240° C. The T die 4 was a coat hanger type, had a width of 1900 mm, is provided with an inner wall which was applied with hard chrome plating and finished to a mirror surface with a surface roughness of 0.1 S. The T die 4 has a lip clearance set to 2 mm.

As shown in FIG. 2a, a film extruded from the T die 4 was made to drop on the first cooling roller (first rotating member for cooling) 5 with a chrome plating mirror surface having a roll width of 2400 mm, simultaneously, the film on the first cooling roller was pressed by the touch roller (second rotating member for pressing) 6 having a roll width of 2400 mm and a temperature adjusted to 100° C.

At this time, the surface temperature of the first cooling roller (first rotating member for cooling) 5 was set to 120° C. which was less than the glass transition temperature (Tg=135° C.) of resin and was more than the melting point of an additive agent (the melting point of 85° C. of a plasticizer and the melting point of 115° C. of an ultraviolet absorber). Further, the touch roller (second rotating member for pressing) 6 pressed the film with a line pressure of 5 N/mm.

The film which was pressed between the first cooling roller (first rotating member for cooling) 5, and the touch roller (second rotating member for pressing) 6 was brought successively in contact with the external surface of each of the second cooling roller (the third rotating member for cooling) 7 and the third cooling roller (the fourth rotating member for cooling) 8, that is, the external surface of a total of three cooling rollers, whereby the film was cooled and solidified, and then the film was separated by the separating roller 9.

A lip gap was adjusted with die bolts such that the unstretched film 10 pinched with pressure by the touch roller 6 had a film thickness profile as shown in FIG. 4a in which a film thickness (T2) at both ends of the effective width of 1500 mm corresponding to a product was 130 μm and a film thickness (T1) at a central portion was 200 μm, here, the effective width does not include both end thicker portions which was caused by neck-in and had a width of 100 mm respectively. This unstretched film 10 was once rolled up to a roll form. Here, the unstretched film 10 had a width of 1700 mm.

Thereafter, the film 10 was rolled out from the roll form, and was subjected o the MD stretching in the MD stretching zone 20 shown in FIG. 3. In FIG. 3, the pinched unstretched film 10 introduced into the MD stretching zones 20 by the guide roller 41 passes through a first before-stretching preheating roller 21, a second before-stretching preheating roller 22, a third before-stretching preheating roller 23, and a fourth before-stretching preheating roller 24, reaches a stretching and preheating roller 25, and is wound around a stretching and the cooling roller 27 by being conveyed while being pressed from an upper portion with a nipping roller 26. Between the stretching and preheating roller 25, and the stretching and cooling roller 27, an upper heating heater 32 and a lower heating heater 33 are arranged.

The film 10 wound around the stretching and cooling roller 27 is conveyed while being pressed from an upper portion by a nipping roller 28 there, and is subjected to an MD stretching here. Further, the film 10 passes through a first after-stretching cooling roller 29, a second first after-stretching cooling roller 30, and a third first after-stretching cooling roller 31 and is conveyed toward the outside of the MD stretching zones 20 by a guide roller 42.

In the following Table 1, Roller number of a preheating roller, a stretching roller, and a cooling roller; Roller usage, Roller diameter (mm), Material, Roughness, and Temperature (° C.) are indicated collectively. Here, in Material of roller, "H-Cr" means hard chromium.

Further, the capacity of the heaters 32 and 33 was made 50 kW, and the output was adjusted to obtain a setting stretching temperature. The height of the heaters 32 and 33 was set as 30 mm, and the pressure of nipping rollers 26 and 28 was set to 2 N/mm.

TABLE 1

| Roller number | Usage of roller | Roller diameter (mm) | Material | Roughness | Temperature (° C.) |
|---|---|---|---|---|---|
| 21 | First before-stretching preheating roller | 200 | H—Cr | 0.8S | 80 |
| 22 | Second before-stretching preheating roller | 300 | H—Cr | 0.8S | 80 |
| 23 | Third before-stretching preheating roller | 300 | H—Cr | 0.8S | 90 |
| 24 | Fourth before-stretching preheating roller | 300 | H—Cr | 0.8S | 90 |
| 25 | Stretching preheating roller | 200 | H—Cr | 0.1S | 130 |
| 26 | Nipping roller | 100 | Silicone rubber | — | — |
| 27 | Stretching cooling roller | 200 | H—Cr | 0.8S | 80 |
| 28 | Nipping roller | 100 | Silicone rubber | — | — |
| 29 | First after-stretching cooling roller | 300 | H—Cr | 0.8S | 80 |
| 30 | Second after-stretching cooling roller | 300 | H—Cr | 0.8S | 30 |
| 31 | Third after-stretching cooling roller | 300 | H—Cr | 0.8S | 30 |

In Example 1 through Example 6, in the stretching process in this MD stretching zone 20, the unstretched films 10 after having been pinched with pressure were stretched in their lengthwise direction by 1.1 times or more and 3.0 times or less on the various kinds of conditions shown in the following Table 2, respectively.

Here, as shown in the following Table 2, as the stretching conditions, Low speed side conveying speed (m/minute), Film thickness difference, T1–T2 (μm), Stretching magnification (times), Stretching temperature (° C.), and Actual stretching span (mm) were changed in Example 1 through Example 6, respectively.

In Example 2, the actual stretching span S was shortened than Example 1. Further, the actual stretching span S was lengthened in Example 3. In Example 4, the stretching magnification was set to low, and in Example 5, the stretching magnification was set to high. In Example 6, the actual stretching span S was made still longer than Example 3. Moreover, in Example 2, in order to adjust the actual stretching span, the MD stretching was performed on the condition that the conveying speed was made low.

Comparative Examples 1 Through 5

For comparison, when the rolled form cellulose acetate propionate unstretched film produced in the above-mentioned Examples 1 through 6 were wound out and subjected to the MD stretching in the MD stretching zone 20, the MD stretching conditions were changed such that one of the stretching conditions became out of the range of the present invention. Namely, in Comparative examples 1 through 5, the cellulose acetate propionate unstretched films were subjected to the MD stretching in the same ways as in Examples 1 through 6 except the changed MD stretching conditions.

Evaluation of the MD Stretched Films

Next, the results of the widthwise shrinkage amount (mm) after the stretching are shown in the following Table 2 with regard to the cellulose acetate propionate films which were subjected to the MD stretching in Examples 1 through 6 and Comparative examples 1 through 5.

Moreover, in the overall width of the film, the film thickness deviation (μm) after the stretching was measured at intervals of 10 mm by the use of a contact type film thickness gage, and the deviation of the maximum thickness and the minimum thickness was evaluated in the range except end portions where film thickness was changed rapidly.

Further, with regard to the evaluation of the orientation unevenness of the film after the MD stretching, the cellulose acetate propionate films after being subjected to the MD stretching in Examples 1 through 6 and Comparative examples 1 through 5 were cut out by 500 mm in the lengthwise respectively, and the light leakage of the respective cut-out film samples under the crossed Nicol prism were evaluated on the basis of the following ranks. The obtained results are shown in the following Table 2.

A: Film in which light leakage was not observed.
B: Film in which unevenness was observed partially in a permissible level.
C: Film in which light leakage was observed.

TABLE 2

| | Film width (mm) | Low speed side conveying speed (m/minute) | Film thickness difference T1-T2 (μm) | Stretching magnification (times) | Stretching temperature (° C.) | Actual stretching span (mm) | Widthwise shrinkage amount (mm) | Film thickness deviation after stretching (μm) | Orientation unevenness |
|---|---|---|---|---|---|---|---|---|---|
| ** 1 | 1700 | 20 | 70 | 1.6 | 170 | 100 | 40 | 2 | A |
| ** 2 | 1700 | 10 | 70 | 1.6 | 170 | 50 | 40 | 5 | B |
| ** 3 | 1700 | 20 | 70 | 1.6 | 170 | 300 | 50 | 4 | A |
| ** 4 | 1700 | 20 | 20 | 1.3 | 170 | 100 | 20 | 3 | A |
| ** 5 | 1700 | 20 | 180 | 2.5 | 190 | 100 | 90 | 2 | A |
| ** 6 | 1700 | 20 | 70 | 1.6 | 170 | 400 | 60 | 6 | B |

TABLE 2-continued

| | Film width (mm) | Low speed side conveying speed (m/minute) | Film thickness difference T1-T2 (μm) | Stretching magnification (times) | Stretching temperature (° C.) | Actual stretching span (mm) | Widthwise shrinkage amount (mm) | Film thickness deviation after stretching (μm) | Orientation unevenness |
|---|---|---|---|---|---|---|---|---|---|
| Comp. 1 | 1700 | 20 | 5 | 1.0 | — | — | 0 | 5 | C |
| Comp. 2 | 1700 | 20 | 70 | 1.0 | — | — | 0 | 60 | A |
| Comp. 3 | 1700 | 20 | 5 | 1.6 | 170 | 100 | 40 | 8 | C |
| Comp. 4 | 1700 | 20 | 220 | 2.5 | 190 | 100 | 90 | 7 | C |
| Comp. 5 | 1700 | 20 | 70 | 3.1 | 170 | 100 | 80 | 12 | C |

Comp.: Comparative example,
** Example

As can be clear from the result of the above-mentioned Table 2, in each of the cellulose acetate propionate films obtained in Examples 1 through 6, the film thickness deviation after stretching was appreciably small, the final film thickness configuration was able to be made flat even for a film casted in a form of a center portion thicker film, and the films having a good flatness were able to be obtained. Further, in Example 6, since the stretching span was long, the influence of the widthwise contraction entered to the central portion, and the film thickness difference between the end portions and the central portion became slightly large. Furthermore, when the stretching span was long, the widthwise regulation force during stretching became weak, stretching unevenness took place, and the orientation unevenness was also slightly inferior.

Moreover, in the evaluation of the orientation unevenness of a film, each of the cellulose acetate propionate films obtained in Examples 1 through 6 was not caused light leakage and had an excellent optical characteristics and was responsible sufficiently to a request to make a protection film thinner in thickness, wider in width and higher in quality for polarizing plates in recent years.

On the other hand, with regard to the cellulose acetate propionate films obtained in Comparative examples 1 through 5, in Comparative example 1, due to the deflection of the touch roller caused its wide width, the end portions were nipped with strong pressure and the central portion was nipped with a weak pressure (or not nipped). Therefore, U-shaped orientation unevenness took place in the widthwise direction, light leakage was observed in the evaluation of orientation unevenness of a film, and their optical characteristics was inferior. In Comparative example 2, the central portion made in the thicker film thickness absorbed the deflection of the touch roller caused its wide width. Therefore, the film was able to be nipped uniformly along the widthwise direction so that the orientation was made uniform in the widthwise direction. However, since the film was not stretched, the thicker film thickness remained as it was and the film was not able to be used as a product. In Comparative example 3, since the film was flat before stretching, when the film was subjected to the MD stretching, the central portion of the film became thin. As a result, its quality was inferior. In Comparative example 4, since the film thickness difference was too large, when the film was pinched with pressure, a peripheral speed difference was caused between a thicker portion and a thinner portion so that streak-shaped orientation unevenness took place. In Comparative example 5, since the stretching magnification was too large, when the film was subjected to the MD stretching, the central portion of the film became thin so that the film thickness deviation after stretching became large and the orientation unevenness was took place.

By the use of the optical films produced in the above-mentioned Examples 1 through 6 and Comparative examples 1 through 5, polarizing plates were produced in the following ways, further, these polarizing plates were incorporated into the liquid crystal display panels (image display units), and visibility was evaluated.

In accordance with the following method, the polarizing plates of the present invention and the polarizing plates of the comparative example were produced by using the optical films produced in the above-mentioned Examples 1 through 6 and Comparative examples 1 through 5, and KC8UCR5 (produced by Konica Minolta Opto, Inc.) being a cellulose ester type optical compensation film as a polarizing plate protective film.

(a) Production of a Polarizing Film

In 100 parts by weight of polyvinyl alcohol (hereafter, abbreviated as PVA) having a saponification degree of 99.95 mol % and a polymerization degree of 2400, a composition impregnated with 100 parts by weight of glycerin and 170 parts by weight of water was melted, kneaded and was subjected to a defoaming process. Subsequently, the resultant melted liquid was extruded on a metal roll from a T die so as to form a film. Then, the film was dried and subjected to a heat treatment, whereby a PVA film was obtained. The thus obtained PVA film has an average thickness of 40 μm, a moisture percentage of 4.4% and a film width of 3 m.

Subsequently, the above PVA film was continuously subjected to the following processes in the order of preliminary swelling, dyeing, uniaxial stretching by a wet method, fixing treatment, drying, and heat treatment, whereby a polarization film was produced.

The preliminary swelling was conducted in such a way that the PVA film was dipped in water at 30° C. for 30 seconds. Then, the PVA film was dipped in an aqueous solution having an iodine concentration of 0.4 g/liter and a potassium iodide concentration of 40 g/liter at 35° C. for 3 minutes.

Subsequently, the film was uniaxially stretched to 6 times in an aqueous solution having a boric acid concentration of 4% at 50° C. under the condition that a tension applied to the film was 700 N/m. Then, the fixing process was conducted in such a way that the film was dipped in an aqueous solution having a potassium iodide concentration of 40 g/liter, a boric acid concentration of 40 g/liter and a zinc chloride concentration of 10 g/liter at 30° C. for 5 minutes. Thereafter, the PVA film was taken out, dried with hot air of 40° C., and further subjected to a heat treatment at 100° C. for 5 minutes. The thus obtained polarizing film had an average thickness of 13 μm and, as a polarizing performance, a transmittance of 43.0%, a polarization degree of 99.5% and a dichroic ratio of 40.1.

(b) Production of a Polarizing Plate

Next, in accordance with the following processes of 1 through 5, polarizing films and polarizing plate protective films were pasted to each other, whereby the polarizing plates of the present invention and the polarizing plates of the comparative example were produced.

Process 1:

The optical compensation films and the optical films were immersed in 3 mol/L of sodium hydroxide solution at 60° C. for 90 seconds, and subsequently, were washed with water and dried.

Similarly, the optical compensation films were immersed in 3 mol/L of sodium hydroxide solution at 60° C. for 90 seconds, and subsequently, were washed with water and dried.

Process 2:

The above-mentioned polarization films were immersed in 2% by weight of a polyvinyl alcohol adhesive bath for 1 to 2 seconds.

Process 3:

Excessive adhesive adhered to the polarization films at Process 2 was lightly removed, and the polarization film was sandwiched between the optical compensation film and the optical film which were subjected to the alkali treatment in Process 1, whereby the films were arranged in a laminated structure.

Process 4:

The laminated films were pasted by two rotating rollers with a pressure of from 20 to 30 N/cm$^2$ at a speed of about 2 m/minute. At this time, this process was conducted with a care that no air bubble enters Process 5:

The laminated films produced in Process 4 were dried at 80° C. in a dryer for 2 minutes, whereby polarizing plates were produced.

The original polarizing plate at the uppermost surface of a commercially available liquid crystal panel (VA type) was peeled off carefully, and at the place, the polarizing plates of the present invention and the polarizing plates of the comparative example were pasted with a matched polarizing orientation respectively.

(Evaluation of Visibility)

The liquid crystal panels of the present invention and the liquid crystal panels of the comparative example obtained with the above ways were arranged on a table having a height of 80 cm from the floor. Two day light straight tube fluorescent lamps (FLR40 S-D/M-X produced by Matsushita Electric Industrial Co., Ltd.) 40 W were made one set and 10 sets of fluorescent lamps were arranged with an interval of 1.5 m on a ceiling section having a height of 3 m from the floor. At this time, when an evaluator stands at the front side of the display surface of the liquid crystal panel, the above fluorescent lamps were arranged on the ceiling section to be placed backward from the head of the evaluator. The liquid crystal display panels were inclined by 25° from the vertical direction on the table so that the above fluorescent lamps were reflected on the panels. On this condition, the easiness in observation (visibility) of a screen of each panels was evaluate with ranks as follows.

A: The reflection of the nearest fluorescent lamp was not worrisome and a character having a font size of 8 or less was able to be read clearly.

B: The reflection of the nearest fluorescent lamp was slightly worrisome. However the reflection of the distant fluorescent lamp was not worrisome. A character having a font size of 8 or less was able to be read with some difficulty.

C: The reflection of the distant fluorescent lamp was worrisome. It was difficult to read a character having a font size of 8 or less.

D: The reflection of the fluorescent lamp was very worrisome. On the reflected portion, a character having a font size of 8 or less was not able to be read.

As a result of the evaluations, any one of the liquid crystal display panels incorporating the polarizing plate employing the optical film produced in Examples 1 through 6 exhibited the evaluation result with a rank of B or more and was excellent in visibility.

In contrast, any one of the liquid crystal display panels incorporating the polarizing plate employing the optical film produced in Comparative examples 1 through 5 exhibited the evaluation result with a rank of C or less.

The invention claimed is:

1. A method for producing a film having a thickness of 20 to 100 μm and a width of 1500 to 4000 mm by a melt casting film producing method, the method comprising:

an extruding process of extruding a melted material containing a thermoplastic resin as a main component in a shape of a film from a casting die;

a pinching process of pinching the extruded film with pressure between a cooling roller and a touch roller; and an MD stretching process of stretching the pinched film in a lengthwise direction, wherein the MD stretching process comprises heating the film by a heater to soften the film and stretching the film in the lengthwise direction between two conveying rollers which are arranged to have an actual stretching span of 50 to 300 mm therebetween;

wherein in the extruding process, a film thickness T1 (μm) at a central portion and a film thickness T2 (μm) at both side portions in a widthwise direction of the extruded unstretched film satisfy the following formula:

$$10 \text{ μm} \leq T1 - T2 \leq 200 \text{ μm, and}$$

wherein in the MD stretching process, the unstretched film is stretched in the lengthwise direction by 1.1 times to 3.0 times such that after the MD stretching process, the film thickness T1 (μm) and the film thickness T2 (μm) satisfy the following formula:

$$T1 - T2 \leq 5 \text{ μm.}$$

2. The method described in claim 1, wherein in the MD stretching process, a stretching temperature is in a range of (glass transition temperature Tg−20) ° C. or more and a melting point Tm ° C. or less.

3. The method described in claim 1, wherein the heater comprises a radiation type heat source.

4. The method described in claim 1, wherein a plurality of preheating rollers and a plurality of cooling rollers are used in the MD stretching process.

5. The method described in claim 1, wherein the touch roller used in the pinching process comprises an elastic roller whose peripheral surface is covered with a metallic thin plate.

6. The method described in claim 1, wherein the thermoplastic resin is a cellulose ester.

* * * * *